March 11, 1947.  P. H. DIXON ET AL  2,417,065
SOLE ATTACHING WITH THERMOPLASTIC CEMENT
Filed Sept. 30, 1944  9 Sheets-Sheet 1

Inventors
Paul H. Dixon
Joseph R. Ioannilli
By their Attorney

Inventors
Paul H. Dixon
Joseph R. Ioannilli
By their Attorney

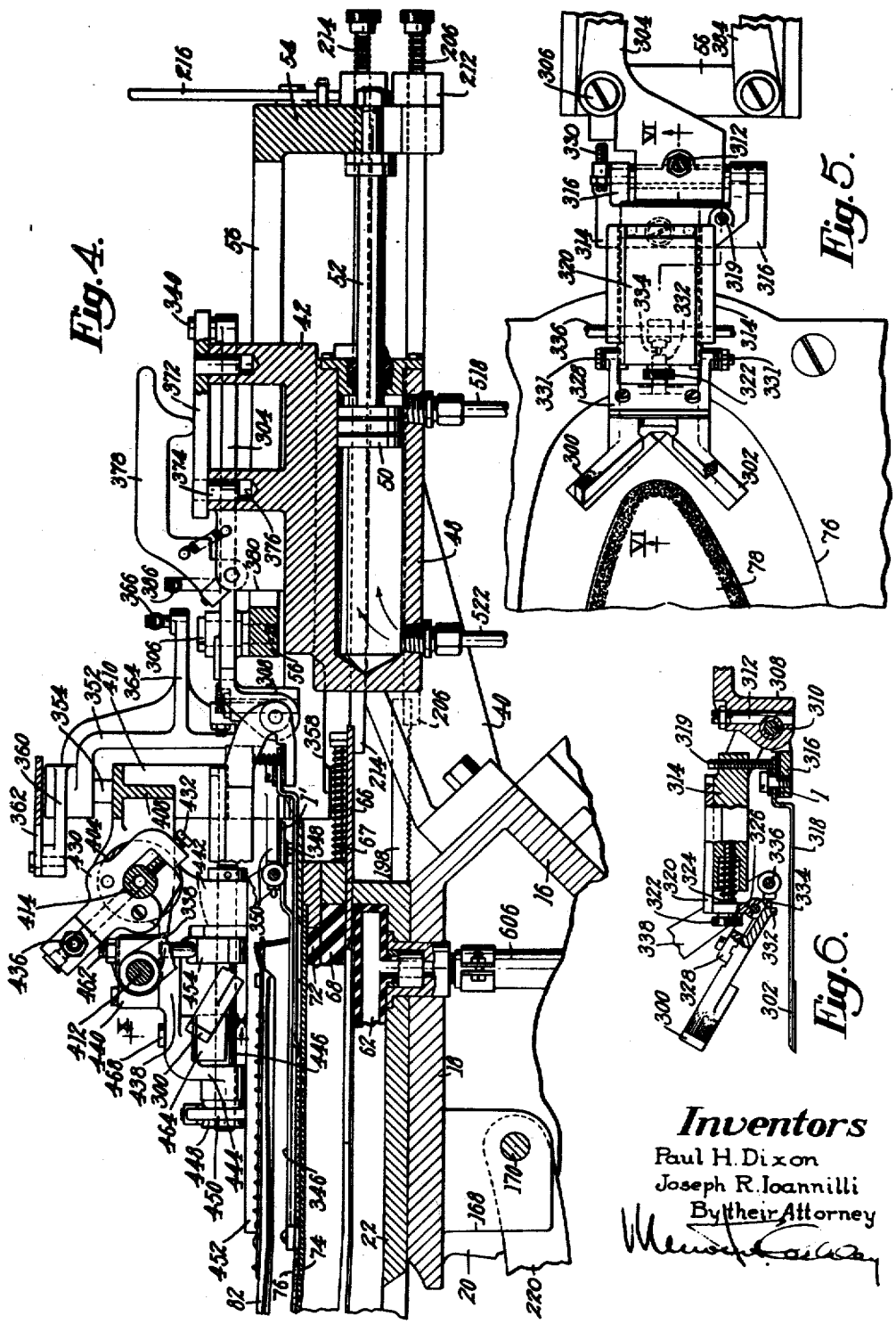

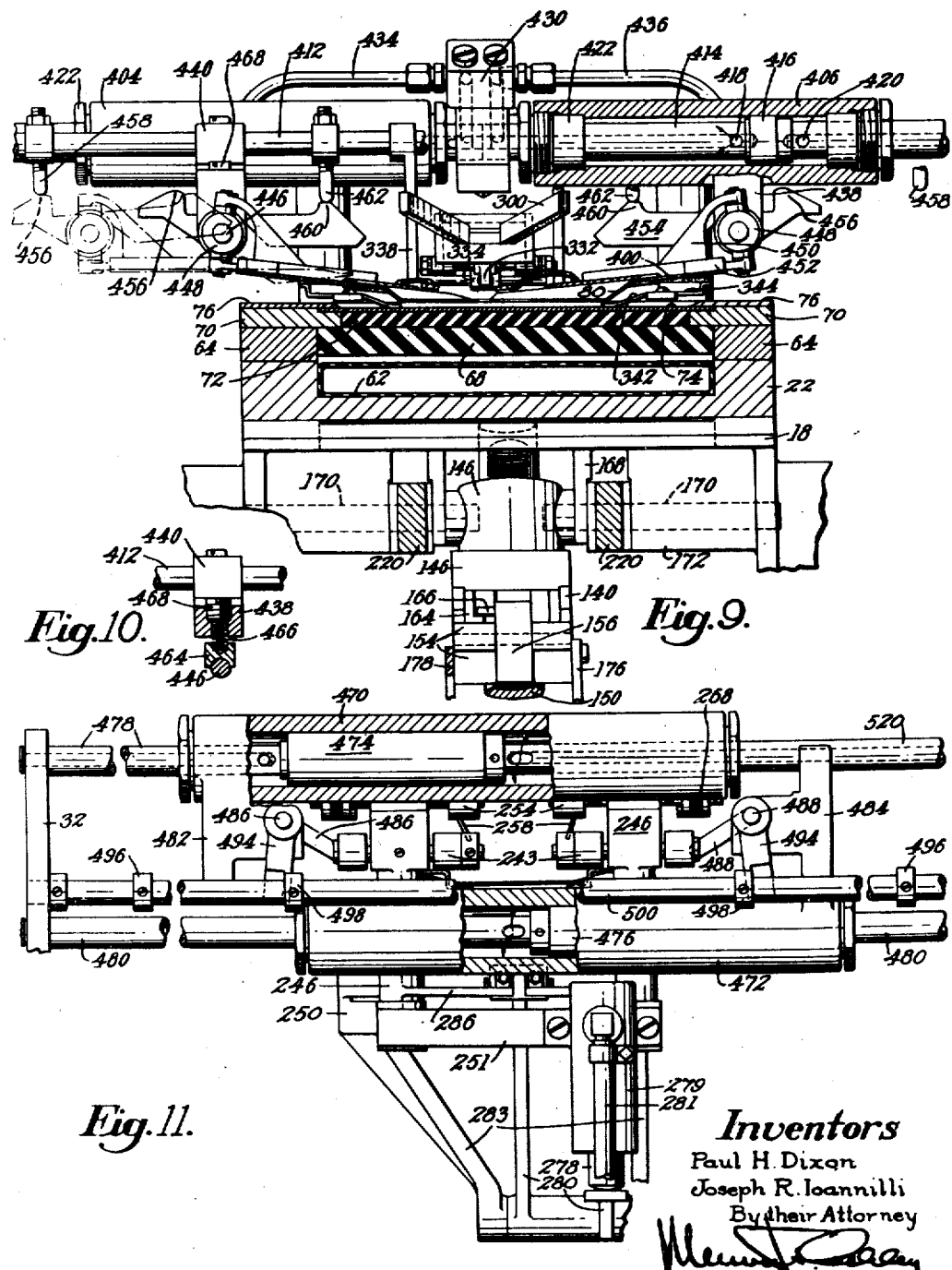

March 11, 1947.    P. H. DIXON ET AL    2,417,065
SOLE ATTACHING WITH THERMOPLASTIC CEMENT
Filed Sept. 30, 1944    9 Sheets-Sheet 6

*Inventors*
Paul H. Dixon
Joseph R. Ioannilli
By their Attorney

March 11, 1947.  P. H. DIXON ET AL  2,417,065
SOLE ATTACHING WITH THERMOPLASTIC CEMENT
Filed Sept. 30, 1944  9 Sheets-Sheet 7

Inventors
Paul H. Dixon
Joseph R. Iannilli
By their Attorney

Patented Mar. 11, 1947

2,417,065

UNITED STATES PATENT OFFICE 2,417,065

SOLE ATTACHING WITH THERMOPLASTIC CEMENT

Paul H. Dixon, Wenham, and Joseph R. Ioannilli, Boston, Mass., assignors to United Shoe Machinery Corporation, Flemington, N. J., a corporation of New Jersey Application September 30, 1944, Serial No. 556,550

57 Claims. (Cl. 12—33)

This invention relates to sole attaching and is particularly concerned with a method and machine adapted for use when a thermoplastic cement is employed. The invention contemplates the activation of the cement, after a sole and shoe have been brought together, by contact with an interposed heated member.

Sole-attaching machines have long been in use in which the attaching of the sole to the shoe is accomplished by means of a cement which has usually been activated before the two are brought together, but such machines require the continuation of pressure for a considerable period of time while the cement sets thoroughly. In other machines, the activation of the cement (i. e., rendering it adhesive) in situ is effected by a high-frequency electrical apparatus. There are many advantages in the use of a thermoadhesive cement which is hard and non-tacky when the sole and shoe are positioned in the attaching machine because it facilitates the exact positioning of the shoe parts and their repositioning, if necessary, with no danger of inadvertent soiling of the shoe by the cement upon the sole because of active cement thereon.

Accordingly, an important object of the invention is to devise an improved method of sole attaching in which the sole and shoe are brought into the desired position before the cement is activated, and in which the latter is accomplished by means of a heating member directly in contact with the cement, which is interposed between the two parts and later withdrawn.

In one aspect, invention is to be found in the use of a flexible metallic blade which is interposed between the two cemented parts and to which heat is supplied to activate the cement. One convenient way of supplying this heat, as illustratively described herein, is the employment of an electric current, illustrated as passed through the blade itself and developing heat therein by reason of the electrical resistance of the blade material.

Still another object of the invention is to provide a sole-attaching machine having improved locating mechanism and arranged to facilitate the application of heat to activate the cement, as by means of a flexible blade.

Features of the invention reside in the shape of the blades, the manner in which they are supported, and in the mechanism for applying an electric current to heat the blades.

It will be recalled that the longitudinal contour of a shoe bottom depends, to a considerable extent, upon the height of the heel to be employed on the shoe and, in the case of some shoes, the contour involves a steep reverse curve. Consequently, an activator blade for employment with such shoes must be flexible enough to assume that contour and, since its electrical resistance should be relatively high, the blade will be relatively thin. As a consequence of these premises, the movement of the blade into place overlying the sole and its withdrawal after the cement has been activated necessitates care to avoid destruction of the blades by twisting such as might result from uneven pulling.

Still other features of the invention reside in rockshaft supports for the ends of activators, such as the blades, and devices for rocking these shafts to tilt the blades upwardly so that they will readily pass in over the edge of a sole and for tilting them downward into contact with the sole. A novel and improved mechanism for withdrawing the longitudinally-bent blade which insures an even pull upon the respective ends is found in a hydraulic slide-actuating mechanism for this purpose.

Sole-locating mechanisms for machines of this type require adjustment of the gaging devices in accordance with the style of the shoe as well as in accordance with the length and width thereof, and it is desirable to make such a mechanism as automatic as possible in order that the operator may not be required to spend an excessive amount of time in adjusting it.

Other features of the invention reside in toe and forepart gaging devices which are automatically adjusted by relative movement between a simple wdege-shaped templet and movable members connected to the gaging devices. The extent of this relative movement depends upon the length of the shoe parts, and a novel device for compensating for the variations in width is interposed between a movable templet-contacting member and a movable gage support.

Still another object of the invention is to devise hydraulic operating mechanism by means of which the required steps in the cycle of the machine may be accomplished in the desired sequence and with as little effort and exercise of judgment upon the part of the operator as is consistent with good results. In the illustrated arrangement and in accordance with features of the invention, the actuation of one device, such as a treadle, causes the sole-and-shoe-locating devices to be moved into position in engagement with the sole. Another operator-controlled device, such as a treadle, effects inward movement of the blades into an overlying relation to the cemented margins of the sole. Still another treadle is employed to set in operation a cam shaft by means of which the successive steps comprising the application of pressure, the heating of the blades, the reduction of the pressure, the withdrawal of the blades, and a succeeding application of pressure, maintained long enough to allow the cement to set, are accomplished automatically in the desired sequence without further attention upon the part of the operator.

These and other features of the invention will best be understood from a consideration of the following specification taken in connection with the accompanying drawings, in which Fig. 1 is a side elevation of the head of a machine in which the invention is embodied, part of the frame being broken away to show more clearly the construction thereof;

Fig. 4 is a longitudinal vertical section through the center of the sole-locating mechanism and a part of the pad box taken on the line IV—IV of Fig. 3, but on a larger scale;

Fig. 5 is a fragmentary plan view of the supports for the toe gages;

Fig. 6 is a longitudinal section through Fig. 5 on the line VI—VI;

Fig. 9 is an enlarged transverse vertical section, taken on the line IX—IX of Fig. 3;

Fig. 10 is a detail of a brake for a blade-supporting rocker arm, taken on the line X—X of Fig. 4;

Fig. 11 is an elevation of the operating mechanism for the rear ends of the blades and having parts broken away and in section;

Fig. 19 is a vertical section through a metering unit which assures simultaneous operation of the blades.

Figure 2:
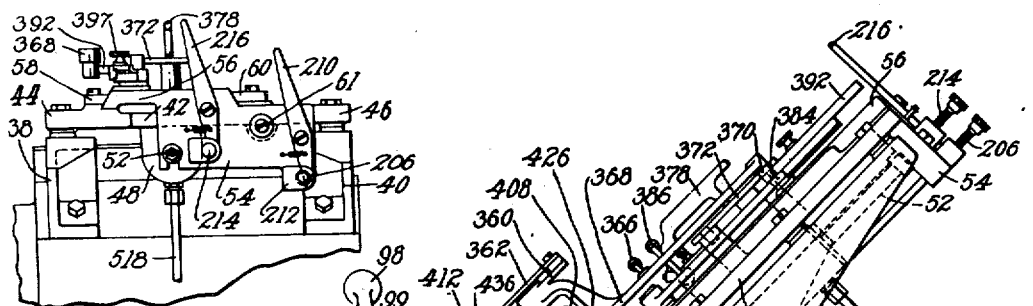
Fig. 2 is an end view of a slide forming part of the sole-locating mechanism of the machine.
Figures 3, 3A:
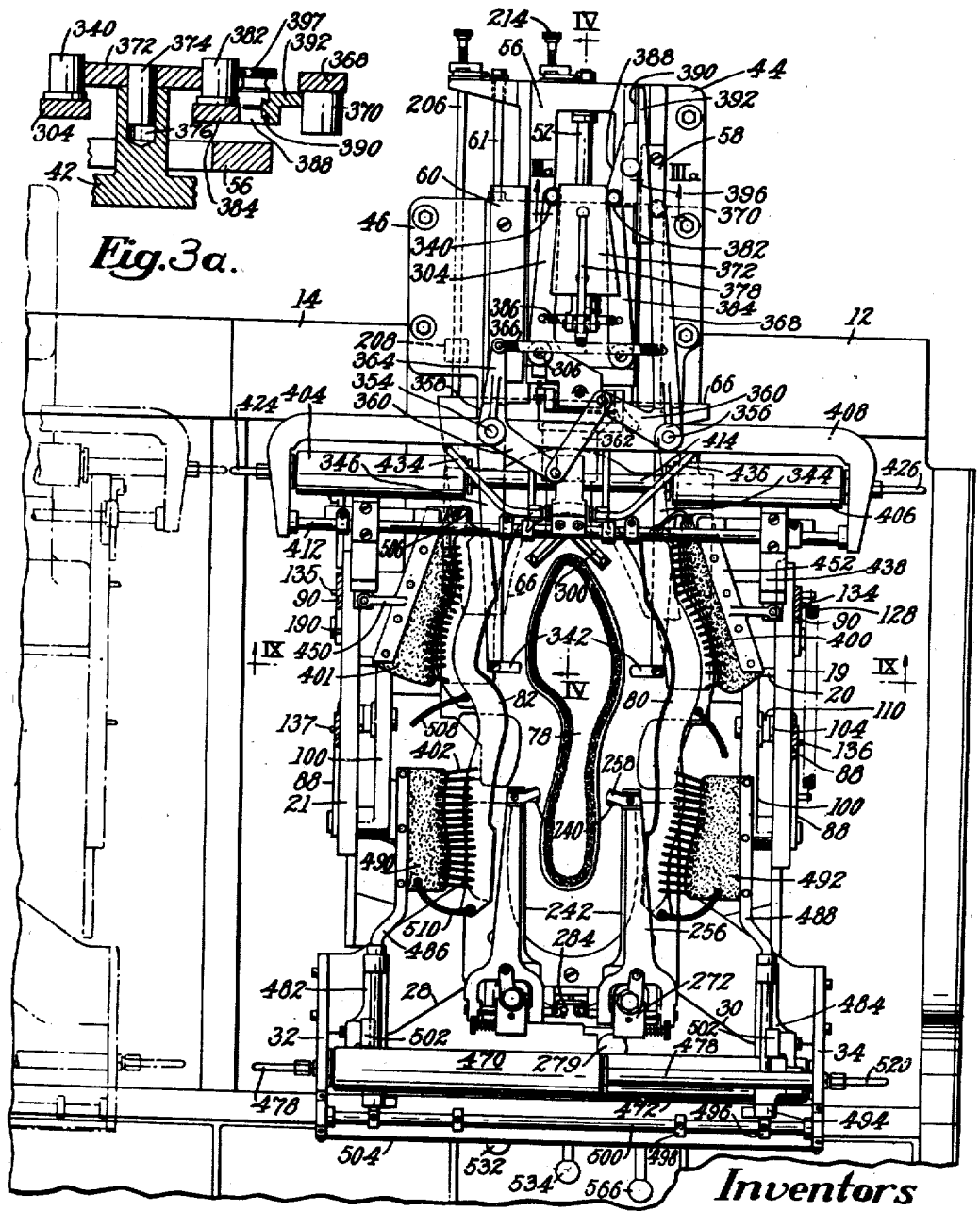
Fig. 3 is a view looking down upon a pad box with which the machine is provided and showing the activator-blade mechanism of the machine and the sole-locating mechanism.
Fig. 3a is a detailed cross section, on a larger scale, taken on the line IIIa—IIIa of Fig. 3.

As suggested by the dash lines at the left side of Fig. 3, it is intended that the machine shall be arranged as a twin machine with one unit designed for use with right shoes and the other for left shoes. For simplicity, only the unit for right shoes is shown in the drawings, and it comprises a frame having a base member 10 (Fig. 17) supported on which are columns 12 and 14 (Figs. 1 and 3) which are at the rear since the operator will stand at the left in Fig. 1. Bolted to these columns is a box-like frame 16 (Fig. 1) which is open at the front and has a cover portion 18 and a transverse web 20. On the upper edges of the sides of this box are ribs 19, 21. Attached to the cover portion 18 is the forepart section 22 of a pad box and, hinged to this forepart section, is a shank section 24 to which, in turn, is pivoted a heel section 26, thus permitting the longitudinal contour of the pad box to be varied in accordance with variations in the heightwise curvatures of the bottom faces of shoes designed to accommodate heels of different heights. On this heel section 26 of the pad box are outwardly-extending arms 28 and 30 (Fig. 3) carrying plates 32 and 34 which support the heel part of a blade-operating mechanism, to be described. Extending rearwardly from the box frame 16 are brackets 38 and 40 (Figs. 1 and 2) to the upper sides of which there is bolted a plate 42 which provides a support for a gage mechanism, to be described. The plate 42 has at the right side (Fig. 3) an elongated extension 44 and at the left a wide extension 46. Beneath this plate and cast integral with it is a small cylinder 48 containing a piston 50 (Fig. 4) the piston rod 52 of which is bolted to the depending end 54 of a slide 56 having the form of a hollow frame with sloping sides. This slide is received in guideways formed on the plate 42 and held there by means of undercut lateral guide plates 58 and 60 (Fig. 2) attached thereto. The slide's outward movement is limited by a stop rod 61 (Fig. 3) secured to the plate 42 and having a head coacting with the depending end 54.

Figure 7:
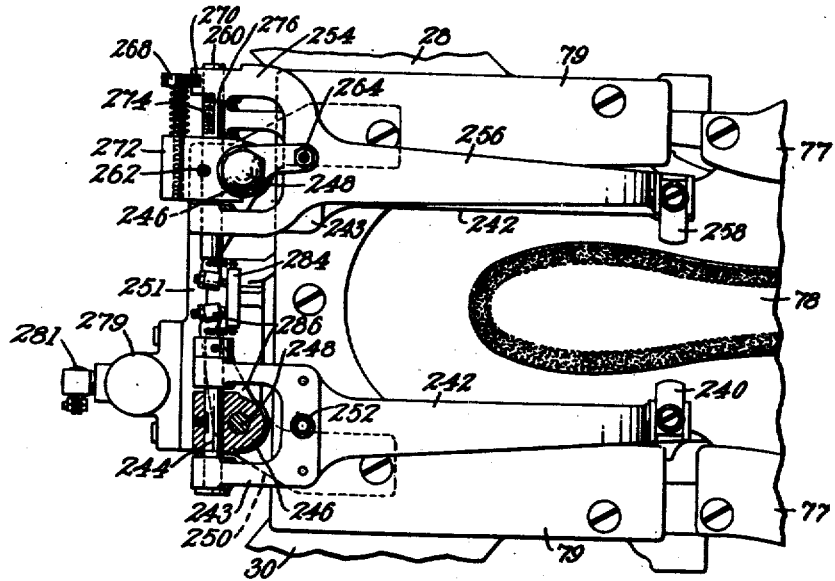
Fig. 7 is a plan view of the gages for the heel end of the sole and shoe.
Figures 15, 16:
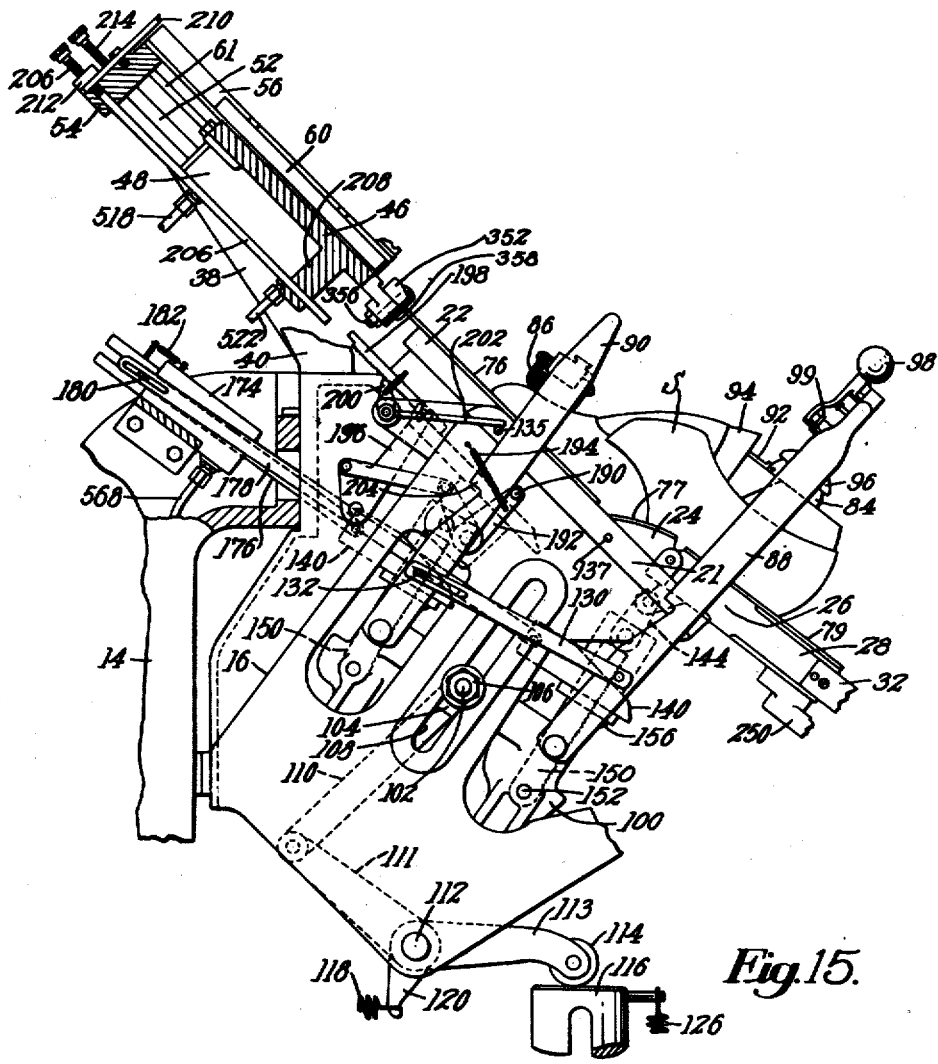
Fig. 15 is an elevation taken from the side of the pad box opposite to that which is shown in Fig. 1 and illustrating some of the stirrup-positioning and operating mechanism.
Fig. 16 is a transverse vertical section, similar to Fig. 14 but showing in section the parts of the pad box which underlie the toe end of the shoe.

Having thus described various supporting members of the structure, we shall proceed more specifically to point out the structure of the attaching press, much of which is not claimed herein as it is the invention of and is claimed in a copending application of Sidney F.nn, Serial No. 556,391, filed September 29, 1944. Each of the sections 22, 24 and 26 of the pad box comprises an open box-like member receiving a hollow, resilient, inflatable pad 62 (Figs. 9 and 16). Mounted upon these box-like members are rims 64 one of which is rabbeted (Fig. 16), above the forepart section, 22 to receive a slidable U-shaped mask plate 66. The outline of this plate is shown in dotted lines in Fig. 3, and, as appears in Fig. 4, the plate is urged rearwardly from the pad box by a spring 67. Above the inflatable pad 62 in each of the sections is a soft-rubber pad 68 (Fig. 16) held in position by an overlapping frame 70 within the confines of which is a thinner pad 72. The frame 70 is rabbeted to receive a cover 74 of leather, or other suitable material, which is clamped in place in the forepart section by a thin plate 76 and, in the shank portion and the heel portion, by suitably shaped cover-holding plates 77 and 79 (Fig. 7).

During the use of the machine, a sole 78 previously coated with a thermoadhesive, now dry, is rested upon the pad cover 74 and positioned there by gages, to be described. It is contemplated that both thermoplastic cements, such as synthetic resin cements, neoprene cement and the like, as well as thermosetting cements, may be employed. Above the sole are then positioned activator or heating blades 80 and 82 (Fig. 3) by which the dry cement may be rendered adhesive, and upon these blades in true position above the sole is placed a lasted shoe S which may or may not have a similar coating on its overlasted upper. The shoe is held in position by clamping means in the form of stirrups 88 and 90, having a heel block 84 (Fig. 15) and a toe rest 86, respectively. The heel block and toe rest are held for lateral adjustment upon the crossbars of the stirrups which are of inverted U-shape. The heel block 84 has a gage projection 92 which may be brought against the rear face of the front cone 94 of the last which is in the shoe, and it is pivotally supported upon a slide 96 capable of being moved laterally by a hand lever 98 connected to the slide by a link 99. Similarly, the toe rest 86 may be manually adjusted transversely of the stirrup 90.

Figure 1:
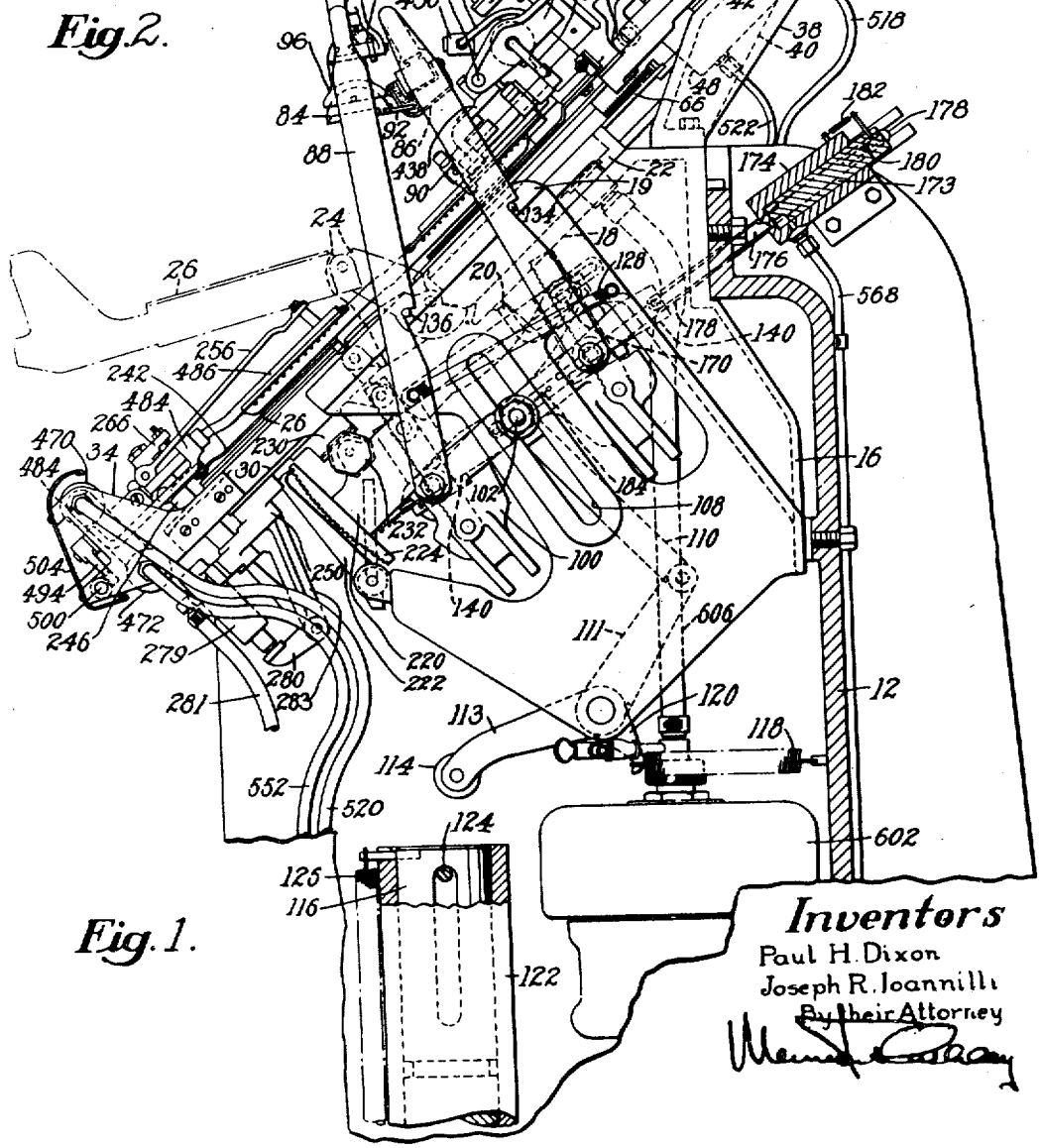

The stirrups 88 and 90, by means of which a shoe is clamped in position, are best shown in Figs. 1 and 15, and they are pivotally attached at their lower ends to a whiffletree 100 carrying outwardly extending trunnions 102 which pass through slide blocks 104 held in position by nuts 106 at the ends of the trunnions. These slide blocks are received in slots 108, there being one slot in each side of the box-like frame 16. The whiffletree 100 is a casting a little wider than a shoe and, on the trunnions, just inside the slide blocks 104, are depending links 110 connected to arms 111 of a bell crank pivoted on a cross rod 112 passing through the sides of the frame 16. The arms 111, with an arm 113 midway of the rod 112, form a bell crank having at the end of arm 113 a roller 114 adapted to receive the upward thrust of a hydraulically-operated piston 116. The action of this piston is to draw down the stirrups and forcibly clamp the shoe and sole on the pad, this pressure being maintained by wedges 140, to be described. When there is no work in the machine, the whiffletree is held in its upward position, as shown in Fig. 1, by a spring 118 connected between the frame and a depending arm 120 on the bell crank. The piston 116 is received within a cylinder 122 (Fig. 1) and has a slot cooperating with a pin 124 which limits its up-and-down movement. The piston is normally held down by a spring 126. When it is moved up by hydraulic pressure, as will be later described, the whiffletree 100 is drawn down to bring the heel-clamping block 84 and the toe clamp 86 on the stirrups into engagement with the last and the shoe (Fig. 15). A spring 128 (Fig. 1) between the box frame 16 and the stirrup 88 urges the latter, when idle, to the rear ready for the next shoe, as shown in Fig. 1. The two stirrups are interconnected by a link 130 (Fig. 15) having a lost-motion connection 132 to the stirrup 90 which prevents the stirrup 88 from falling against and injuring the stirrup 90. Between the completion of one shoe and treatment of the next, the stirrups are held up away from the pad by pins 134 and 136 in the rib 19 of the frame box 16 (Fig. 1) and by corresponding pins 135 and 137 on the other ribs 21 (Fig. 15), and the stirrups are notched to engage these pins in their upper, idle positions to prevent their accidental depression when no shoe is in position on the pad.

Figure 8:
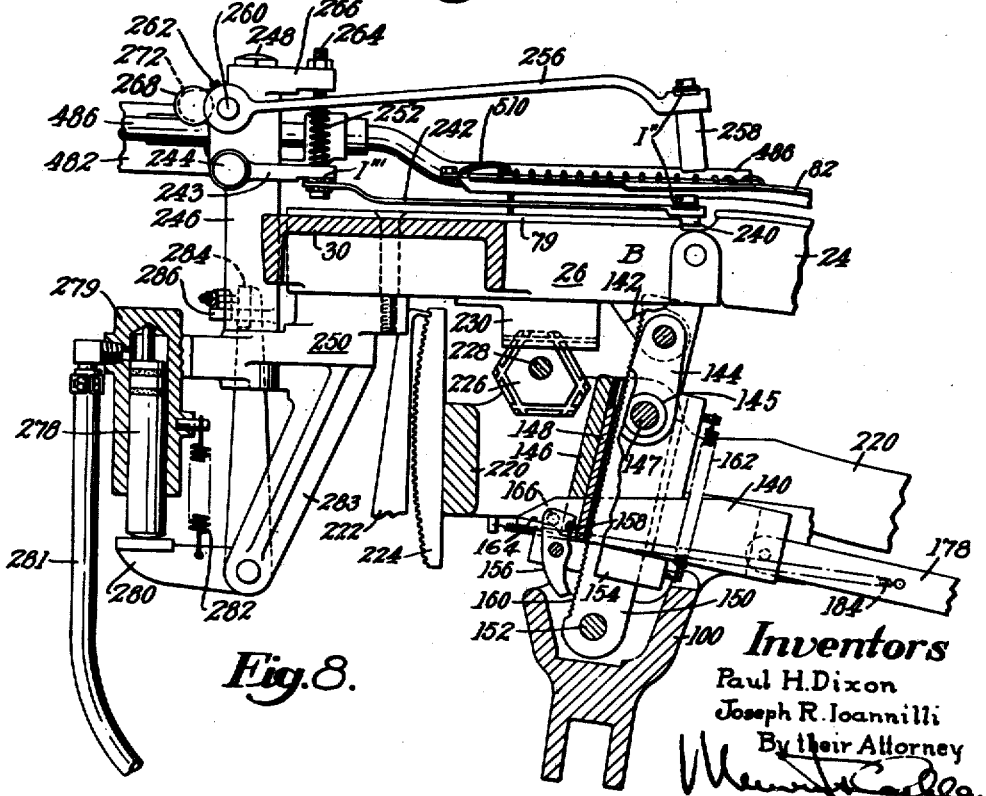
Fig. 8 is a side elevation of the heel end of the pad box and including a part of the wedge-operated connection between shoe-clamping stirrups and the pad box, parts being broken away and in section.

There are connections between each end of the pad box and the whiffletree which are extensible and which receive wedges such as that shown at 140 in Fig. 8. The connection between the heel end of the whiffletree and the heel portion 26 of the pad box comprises depending lugs 142 thereon (Fig. 8) and, hung on the inner sides of these, links 144 pivoted to trunnions 145 on the opposite sides of a hollow block 146. Pins, one of which is shown at 147, secured in the sides of the lever 220 enter recesses in the trunnions 145 (see the similar connection to the forepart section in Fig. 9). Within this hollow block 146 there is slidable a sleeve 148 and a strut 150 mounted on a cross pin 152 in the whiffletree. The sleeve 148 is enlarged at its lower end 154 to provide a mount for a pawl 156 which, at times, is held by a spring 158 in engagement with ratchet teeth 160 on the strut 150. The enlarged end 154 of the sleeve and the block 146 are joined by a spring 162 which tends to draw them toward each other and against the bifurcated wedge 140 (see also Fig. 9). On one side, this wedge has a ledge 164 cooperating with a pin 166 on the pawl 156 to hold the latter out of engagement with the ratchet teeth 160 when the wedge 140 is retracted to the position shown in Fig. 8. As the wedges are moved in to the left by springs 184 (one of which is shown in Fig. 8), this ledge 164 moves away from the pin 166 and allows the pawl spring 158 to push the pawl 156 against the teeth 160 on the strut 150.

The forepart connection, shown in Fig. 9, between the whiffletree 100 and the frame cover 18 which supports the forepart section 22 of the pad box is substantially the same as the connection to the heel section 26 except that, in this instance, the links 144 are omitted and the hollow block 146 is hung between flanges 168 by means of pins 170 which are carried by downwardly projecting bosses 172 on the frame plate 18.

The wedges are individually connected by bars 176 and 178 (Figs. 8 and 15) to a piston 173 (Fig. 1) within a cylinder 174 supported on the column 12. At their forward ends, these bars are slotted and adjustably connected to a pivot rod 180 passing through the end of the piston, and the latter is drawn into its cylinder by a spring 182. This piston and cylinder serve as means for withdrawing or "knocking out" the wedges when it is desired to relieve the pressure on the stirrups, whereas the wedges are drawn into operative position by the springs 184 acting in the same direction as the spring 182.

In positioning the stirrups in engagement with the shoe, we have already seen how the gage projection 92 serves to position the heel stirrup. The best position for the toe stirrup, on the other hand, varies with the size and style of the shoe and, to determine this and limit the movement of the toe block 86 toward the heel end of the shoe, an adjustable limit pin 190 (Fig. 15) has been provided. This pin is carried by a bell crank 192 which is urged, between cycles, toward the front end of the shoe by a spring 194. Movement of the bell crank to carry the pin 190 in the opposite direction is controlled by a link connection to another bell crank 196 the forked end of which engages a sliding ratchet bar 198, locked in position by a pawl 200 spring-pressed into engagement with it and having an arm the end of which is adjacent to the pin 135. However, if the stirrup 90, when tilted rearwardly in idle position, is hung on this pin 135, then the rear face of the stirrup adjacent to a shoulder 204 engages this arm 202 and thereby releases the pawl 200, permitting the ratchet slide 198 to be adjusted by contact with the end of a rod 206. This rod is carried in the depending end 54 of the slide 56 and in a depending lug 208 (Figs. 3 and 15) on the side extension 46 of the plate 42 and operates to adjust the released ratchet when the slide moves forwardly to bring in the sole gages. The rod 206 is held in adjusted position according to the style of shoe by a hand-operated latch 210 (Fig. 2) pivoted on the end of the slide and having a notched end adapted to underlie a flange 212 and to engage a groove (best shown in Fig. 4) in the rod 206.

A similar hand-adjusted device is utilized for adjusting the position of the mask plate 66 and comprises a rod 214 (Fig. 4), abutting or secured to the mask plate, and having grooves and a handle at its outer end where it passes through the depending portion 54 of the slide. The mask plate is normally urged to its extreme rearward position (away from the operator) by means of the spring 67 and is returned into just the desired relation to the pad box by means of the slide 56 to which the rod 214 is adjustably connected by means of a notched latch 216 constructed as is the latch 210 which was described above and permitting corrections for style differences.

The longitudinal contour of the pad box, made up of the articulated parts 22, 24 and 26, is adjusted by the operator in accordance with the contour of the shoe to be treated. To this end, a U-shaped supporting loop 220 is provided which is pivoted on the pins 170 (Figs. 1 and 9) and, as the heightwise position of the rear end of this loop 220 is adjusted, it is held there by a hand-operated spring-pressed pawl 222 (Fig. 1) supported on the frame box 16 and engaging notches of a segment 224 secured to the rear end of the loop. This varies t1e angular relation between the forepart and the shank portion of the pad box so that the longitudinal contour of the box is changed to accommodate the bottoms of shoes which are to have heels of different heights. On the other hand, if it is desired to vary the angular relation between the heel section 26 and the shank section 24, this may be accomplished by means of hexagonal grooved blocks 226, one of which is shown in Fig. 8, and which are carried by a rod 228 extending transversely of the loop 220 and are arranged to engage ribbed flanges 230 depending from the heel section 26 of the pad box. This rod is provided with an operating handle 232 (Fig. 1) and is normally spring-pressed toward the observer but may be moved transversely to release the blocks 226 from the corresponding flanges 230 and enable this six-sided cam member 226 to be moved to a position where the particular groove which will engage one of the ribbed flanges 230 (Fig. 8) will give the desired heightwise displacement between the heel end portion 26 and the loop 220.

The locations of the sole and the shoe upon the pad box are determined by means of gages which include heel gages for the sole and for the shoe, ball-line gages for the sole, and toe gages for both the sole and the shoe. The construction and means of adjustment of these are next to be described, and those at the heel end are shown in Figs. 3, 7, 8 and 12. They comprise sole-engaging numbers 240 (Fig. 7) carried on arms 242 which are attached to forked plates 243 mounted on cross pins 244 carried in hubs 246 pivotally supported upon vertical studs 248, and the latter are supported in brackets 250 (Fig. 8) which are attached to the heel section 26 of the pad box by means of screws and are connected by a cross-bar 251 (Fig. 11). The arms 242 which carry these gages are slightly flexible heightwise of the machine and the gages themselves rest upon the cover of the pad box, being pressed downwardly by springs 252 which are interposed between the top side of each of the forked members 243 and the under side of a similarly shaped forked portion 254 of arms 256 (Figs. 7 and 8) which carry shoe gages 258. It will be noted from Fig. 12 that these shoe gages are bent downwardly and inwardly from the arms 256 which support them and thus assist in centering a shoe as it is placed on its sole. The forked portions 254 (Fig. 7) of the shoe-gage arms are pivoted on cross pins 260 which are held by set screws 262 in the upper ends of the hubs 246. In order to limit the upward movement of the arms 256 carrying these heel-end shoe gages, stop screws 264 are provided which are held in rearwardly projecting arms 266 at the tops of the hubs 246. Individual lateral adjustment of these heel-end shoe gages with respect to each other and the sole gages, to accommodate style differences, is readily effected by means of hand screws 268 the heads of which fit in grooves 270 in one end of the forked portions 254. The screws 268 are threaded in the shoulders 272 of the hubs 246 and, to facilitate a duplication of the adjustments made, graduations 274 are provided upon the pins 260, and the position of the gage may be determined by noting the position of a shoulder 276 with respect to these graduations.

Swinging of these heel gages, about the vertical studs 248, to bring them in against the sides of a sole and the sides of a shoe is effected by means of a fluid-operated piston 278, in a cylinder 279, attached to the bracket cross-bar 251. The piston bears against the lower arm of a bell crank 280 pivoted in hangers 283 (Fig. 11) integral with the brackets 250. This bell crank, as viewed in Fig. 8, is normally urged clockwise by means of a spring 282. The upper end of the upright arm of this bell crank has a flange 284 (Fig. 7) positioned for engagement with set screws in the ends of arms 286 (Fig. 11) formed on the lower portions of the hubs 246. When fluid under pressure is supplied to the cylinder 279 through a line 281, the gages will be moved equally and oppositely in toward the work. Inasmuch as the brackets 250 are supported upon the heel 26 of the pad box, this actuating mechanism for the heel-end gages operates independently of the position of adjustment of that portion of the pad box.

The position of the toe end of the work is determined by a forked toe-end shoe gage 300 (Figs. 4, 5 and 6) of substantial thickness, for engagement with the toe end of the shoe, and a thinner forked plate 302 for engagement with the toe end of the sole. These are carried through intermediate members, to be described, by a lever 304 (Fig. 3) pivoted by a screw 306 upon the hollow slide 56 and hence movable longitudinally of the work, bringing the gages into engagement therewith. The front end of this lever 304 has a depending portion 308 (Fig. 6) in which a sleeve surrounding a pin 310 is clamped by means of a draw bolt 312. On this pin 310, there is supported a U-shaped carrier 314 for the shoe gage 300 and, below the carrier 314, another U-shaped member 316 to which there is attached, by a screw and dowels, a plate 318 which terminates in a toe gage 302 for the sole. These U-shaped carriers are held in spaced relation by a stop screw 319. The upper side of the carrier 314 is undercut to receive a dovetail-shaped slide 320 which is adjustable with respect to the carrier by means of a thumb screw 322 against or with a compression spring 324. This slide has a depending portion 326 on which there is pivotally supported a U-shaped member 328 (Fig. 5) to which the toe-end shoe gage 300 is attached by screws. It will be noted from Fig. 5 that the upward movement of the gage carrier 314 is limited by a stop screw 330. In addition, means are provided to tilt up the toe-end shoe gage 300, when the slide 56 is in its rearward position shown in Figs. 4 and 6, by providing that gage with a prong 332 which comes into engagement with a stud 334 carried on a cross rod 336 which is supported by depending hangers 338. Having been brought to this uptilted position, the shoe gage 300 is held there frictionally by washers 331 on the bolt extending through the depending portion 326, while it and the sole gage 302 are moved in over the pad box. When, at a later time, a shoe is positioned above the sole, the toe of the shoe will be pushed into the fork of the gage 300 and then downward, carrying the gage with it. This arrangement renders it easier to see the sole gage 302 when a sole is positioned and it also keeps the gage 300 out of the path of movement of the incoming blades. The rearwardly extending portion of the lever 304 has a cam roll 340 for a purpose to be described.

The position of the ball of the sole is determined by ball-line gages 342 (Figs. 3 and 12) which are carried on arms 344 and 346 attached by screws 348 (Fig. 4) to projecting portions 350 of forked levers 352 mounted on upright studs 354 and 356 (Fig. 3) which are supported on lugs 358 extending toward the front of the machine from the side portions 44 and 46 of the plate 42 fixed to the bracket 40. These forked levers 352 have integral arms 360 which are joined by a link 362 to cause equal and opposite movement of the gages. On the left-hand lever 352 is a short arm 364 joined by a spring 366 with a long arm 368 upon the other lever. This arm 368 has a depending cam roll 370 (Fig. 1).

Control of the position of these toe and ball-line gages to suit the style of the shoe and to an amount depending upon the size of the particular shoe is effected by a templet 372 (Fig. 3). Various shapes of templets are provided for different styles of shoes being treated, and the one in use is positioned on the plate 42 by means of dowels 374 (Fig. 4) received in sockets 376 formed in uprights on the plate 42. The templet is held in these sockets by a spring-pressed clamp 378 mounted in the forked end of a web 380 formed upon the plate 42. The left side of this templet, as viewed in Figs. 3 and 3a, is engaged by the upright roll 340 on the lever 304 which supports the toe gages 300 and 302. The other side of the templet is engaged by a cam roll 382 which is at the end of a member in the form of an arm 384 which is pivotally supported on the slide 56 and is held against the templet by a spring 386 extending between the lever 304 and this arm 384, the position of the arm depending on the shape of the templet and the extent of movement of the slide. An integral extension 388 of the arm 384 is split, as shown in Fig. 3a, and provided with an undercut groove to receive a dovetail rib 390 upon a wedge-shaped portion 392 against which rests the roll 370 depending from the long arm 368 which is pivoted on the stud 356 and which forms an extension of the gage arm 344. The position of the arm 368, and hence of the ball-line gages, therefore, depends both upon the adjustment of the wedge portion 392 and the shape of the right side of the templet 372. The wedge 392 is provided with graduations 396 (Fig. 3) to enable its position with respect to the extension 388 to be determined in accordance with the width of the shoe and a thumb screw 397 is provided to clamp the wedge in adjusted position. When, as later explained, the slide 56 is moved by reason of the fluid admitted to the cylinder 48, the positions of the toe gages and the fall-line gages will be shifted, as later described, in accordance with the style and length and width of the shoe in question.

Figure 12:
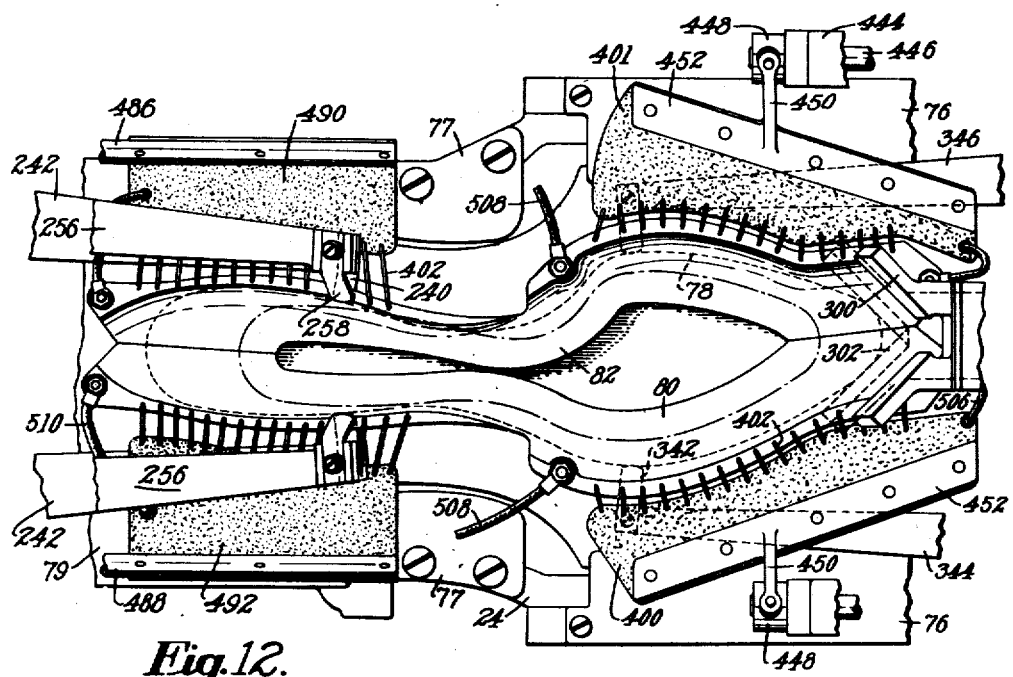
Fig. 12 is a plan view of the jointed pad box, showing a sole positioned by its gage and with the activator blades overlaid upon the margins of the sole.
Figure 13:
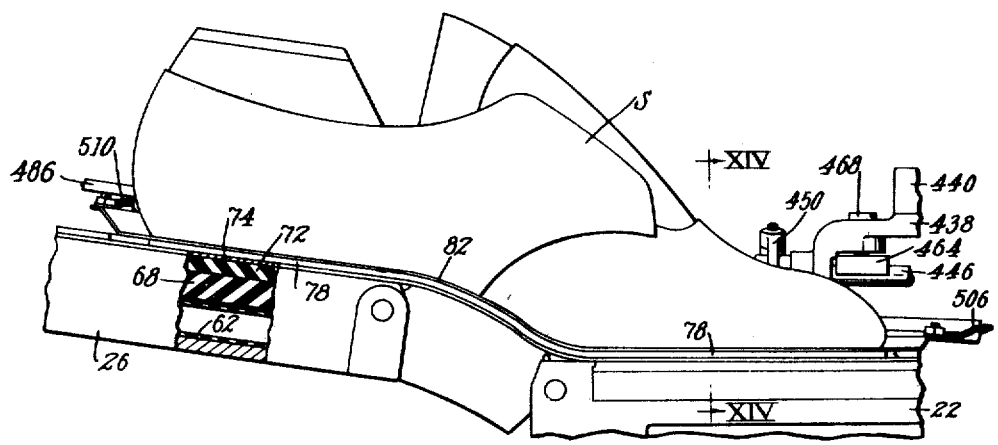
Fig. 13 is a side elevation, partly in section, of the parts shown in Fig. 12, and with a shoe in position on the blades.
Figure 14:
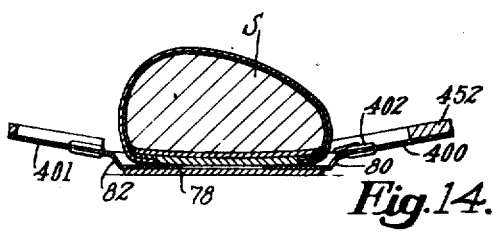
Fig. 14 is a transverse vertical section on the line XIV—XIV of Fig. 13 through the toe end of the shoe.

To particularly adapt the machine for use with cements which may be activated by the application of heat, the activators 80 and 82 are provided, the shapes of the inner edges of which approximate those of the outlines of the sides of the sole, leaving the uncemented mid-portion of at least the forepart uncovered or free of contact with the activators. As a result, the sole, when under pressure, contacts the shoe bottom and thus helps to prevent any change in the relative positions of the shoe parts when the activators are withdrawn. It will be understood that one unit of the machine is intended for use with right shoes and the other unit, indicated in dash lines at the left in Fig. 3, is complementally shaped for use with left shoes. These activators, as illustrated, are thin, flexible sheets or blades of electrically conductive material, such as metal, in order that they may be readily heated to activate the cement which they contact by the application of an electrical current in a manner to be described. At the same time, the use of metal permits them to bend transversely in accordance with the longitudinal contour of the shoe. The forepart portions of the blades are attached to sheets of insulation 400 and 401 by a series of loops 402 (Figs. 3, 12 and 16).

In order that these blades may be moved inwardly to a position in which they overlie the sole in contact with the cement on the attaching surface thereof and in order that they later may be withdrawn after the cement has been activated, they are supported on similar movable carriers. At the toe end these carriers are forepart cylinders 404 and 406 (Figs. 3 and 9) which are slidable in a frame comprising a U-shaped casting 408 (Fig. 3) having sleeve portions 410 (Fig. 4) which surround and are supported on the studs 354 and 356 and at their lower ends rest upon the lower portions of the forked levers 352. The open side of the U-shaped casting is closed by a cross rod 412. It is this rod which also serves as a support for the hangers 338 which carry the stud 334 used to elevate the toe gage 300 when the slide is in the position shown in Fig. 4. Carried in this hollow frame there is a transversely-extending hollow rod 414 which is fixed in position therein and is provided with enlargements 416 (Fig. 9) serving as pistons on which the cylinders 404 and 406 slide. At each side of these pistons are ports 418 and 420 in the hollow rod adapted to be alternatively supplied with a fluid under pressure so that the cylinders, the ends of which are closed by means of stuffing boxes 422, will be forced inwardly or outwardly to carry the foreparts of the blades with them. The outer ends of the rod 414 are supplied with fluid through pipes 424 and 426 (Fig. 3) and the middle portions are supplied with fluid through a connector block 430 (Fig. 4) which is held in position on the rod by means of a clamp screw 432. In this connector block 430 are passages leading to the inner ports 418, and these passages are supplied in turn by means of pipes 434 and 436.

Each cylinder is provided near its mid portion and on its under side with an arm 438 (Fig. 4) integral with the cylinder and which extends toward the front of the machine beneath the cross rod 412. These arms are slidably connected to the cross rod by bearing blocks 440. Each of the arms 438 is also provided with hangers 442 and 444 in which are carried rockshafts 446 each of which has a trunnion block 448 pinned thereto at its front end. These rockshafts are substantially parallel to the tops of the pad-box sections on which they are carried. The sheets of insulation 400, 401 carrying the blades are supported on these blocks by forked arms 450 (Fig. 9) which are pivoted on the trunnions of blocks 448 to make a gimbal-like joint and avoid any cramping of the blades. Each of the forked arms 450 spreads out into a plate 452 (Fig. 3) which is riveted to the sheet of insulation, as shown more specifically in Fig. 12.

It is desired that the blades shall not contact with the gages or with the edges of the sole as they are moved inwardly and, consequently, means are provided for tilting the rockshafts so that the inwardly moving blades carried by the cylinders 404 and 406 shall be tilted up when they are moved in over the edge of the sole and then tilted down as they reach the desired positions above the margins of the sole. This is done by rocker arms 454 (Fig. 9) which are similarly but reversely shaped and are provided with outer humps 456 to tilt the blade carriers up when the humps engage the lower ends of pins 458 which are mounted on the outer ends of the cross rod 412 and with humps 460 to depress the blades when they have reached positions over the margins of the sole and the rocker arms are in engagement with pins 462 near the inner mid portion of the rod 412. It is desirable that the rocker arms 454 shall be held frictionally so that they will rotate only when engaged by the depending pins 458 and 462 and, accordingly, the rockshafts 446 are provided with brake blocks 464 (Fig. 10) which are held in engagement therewith by springs 466 held in position by screws 468 threaded in the arms 438.

To carry in and to withdraw the heel ends of the activating blades, the machine is provided with heel-end cylinders 470 and 472 (Figs. 1, 3 and 11). These cylinders are slidable upon pistons 474 and 476 which are fixed to hollow rods 478 and 480 carried by the plates 32 and 34. Integral with these cylinders are bearing blocks 482 and 484 projecting down and up, respectively, and forked at their lower and upper ends to slide along the opposed piston rods and thereby to restrain the cylinders against rotation around the piston rods. These bearing blocks carry rockshafts 486 and 488 which extend rearwardly of the machine beside the pad box and at their rear ends are riveted to sheets of insulation 490 and 492 (Figs. 3 and 12). The sheets are, like the forepart sheets 400 and 401, loosely secured to the activating blades by means of wire loops, such as the loops 402 previously described. It will be noted that the rockshafts 486 and 488 are bent downwardly (Fig. 8) and inwardly (Fig. 3) as they leave the bearing blocks 482 and 484 and, in order that they may be rocked to lift the blades as they are moved inwardly over the edge of the sole, the rockshafts are provided near the cylinders with depending rocker arms 494 (Fig. 11) the lower ends of which, as may be seen in Fig. 1, are slightly offset to engage collars 496 and 498 on a rod 500 which extends between, and is supported by, the plates 32 and 34. Near the end of the inward movement of the cylinders to dispose the blades above the sole, the rocker arms 494 engage the inner collars 498 and push the blades down into contact with the sole. On the other hand, when the cylinders approach the outward limit of their movement, the rocker arms engage the outer collars 496 and raise the blades ready for the next inward movement. On the bearing blocks 482 and 484, brake blocks 502 (Fig. 3) are provided which restrain the rocker arms 486 and 488 from turning until the arms 494 attached thereto engage one or the other of the collars on the rod 500. The brake blocks 502 are constructed like the similar brake blocks 464 which are shown in Fig. 10. Protecting the operator from this blade-moving mechanism is a cover plate 504, as shown in Fig. 1.

The activator blades 80 and 82 are heated by the passage of an electrical current therethrough and, since the foreparts of these blades are considerably wider than the rear ends to accommodate the considerably greater variation in the size and shape of the foreparts of soles than of the rear parts thereof, the electrical resistance of the foreparts is lower than that of the heel parts and hence the voltage applied to the forepart portions is less than that applied to the heel portions. Accordingly, electrical connections 506, 508 and 510 (Fig. 3) are provided which extend to the secondary of the transformer 512 (Fig. 18) through the primary of which current from a suitable source is passed to cause the blades to be heated at the desired time in the cycle, as will be later described.

In order to avoid leakage of current and to safeguard the operator from any possible danger of shock, insulating material is interposed between those parts of the mechanism which might come in contact with the electrically heated blades and the supports upon which said parts are mounted. For example, there is insulating material I between the toe gage plate 318 (Fig. 6) and the U-shaped frame 316 upon which this is mounted. It will also be seen, from Fig. 4, that there is insulating material I' between the arms 346 which carry the ball gages and the projections 350 to which these are attached. Also, as shown in Fig. 8, there is insulating material I'' between the sole gages 240 at the heel end and the arm 242 upon which they are supported as well as between the shoe gages 258 and the arms 256 upon which these are mounted. Insulating material I''' is also inserted between the forked plates 243 and the gage arms 242.

Figure 17:
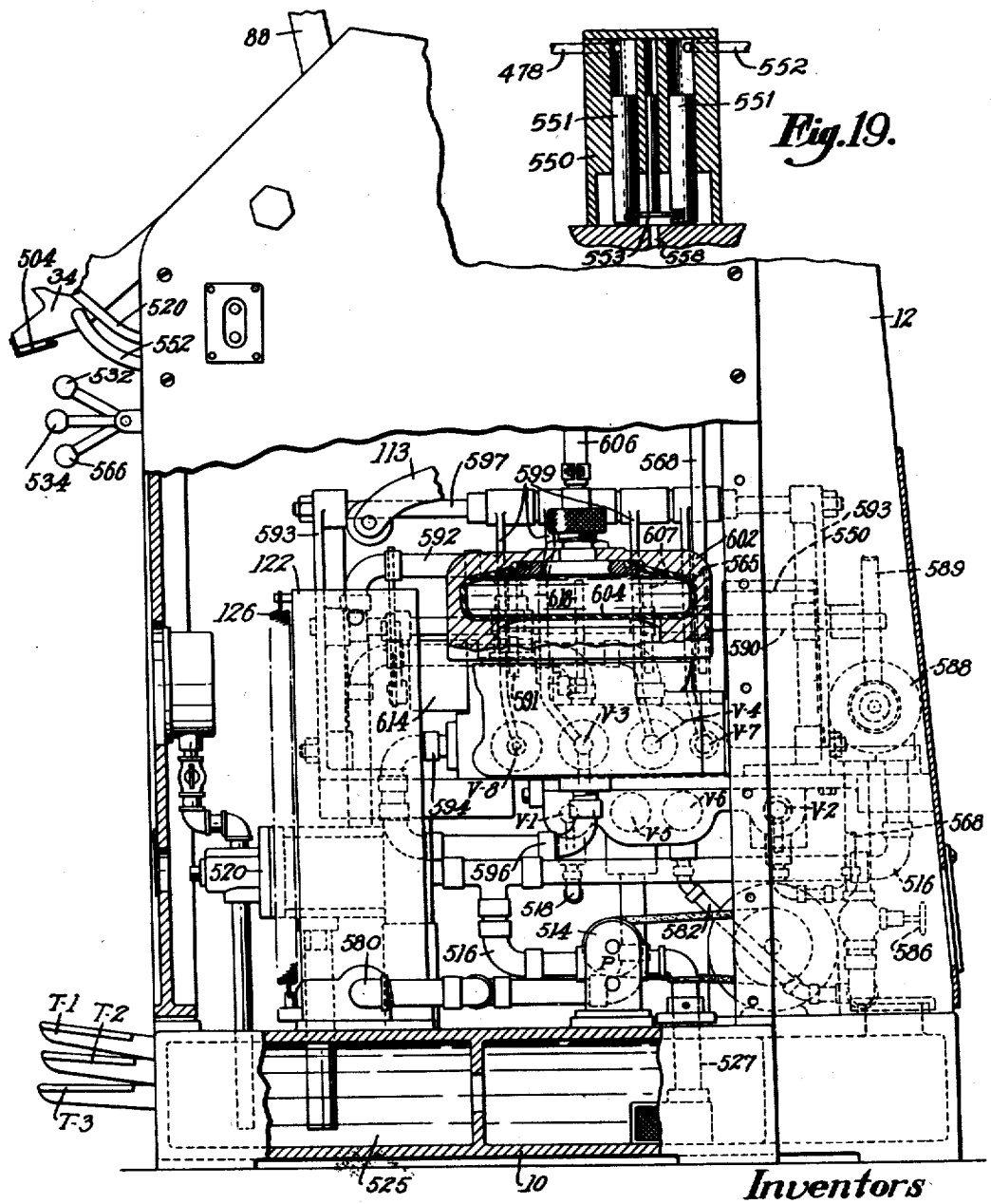
Fig. 17 is an elevation with parts of the machine broken away and in section and showing the position of the parts of the hydraulic control mechanism.

It has already been pointed out that the operation of the various parts of the machine is effected hydraulically, and the control of these hydraulically-operated devices will now be described with the aid of the diagram of Fig. 10, showing valves V—1 to V—8 the position of which in the machine is shown in Fig. 17. The starting positions of the valve pistons is shown in full lines in Fig. 18 and the second position thereof in dotted lines. The valve V—8 is shown in full lines in an intermediate position and will be moved first to the left to a dotted line position and then to the right to a position indicated by double dotted lines. In this hydraulic system, pressure is maintained by means of a pump 514 through a distributing line 516 and the pressure in this line is held at 100 pounds per square inch by the operation of a pressure-control valve *a* contained within a casing 520. The construction of this valve may be of any well-known type.

As a first step in the operation of the machine, a selected and previously cemented sole may be placed upon the cover 74 of the pad box slightly forward of its expected position and will be positioned thereon by various gages, including the toe-end sole gage 302, the ball gages 342 and the heel-end sole gages 240. The toe gage 302, for example, as well as the shoe gage 300, will be moved into operative position by the piston within the small cylinder 48 and will accompany the slide 56 impositively to engage the sole, whenever the operator depresses a treadle T—1, thereby sliding to the right the pistons contained within a valve V—1. This having been done, fluid will pass from the supply pipe 516 out through a line 518 to the cylinder 48, the other end of which will exhaust through a line 522 connected at that time with an exhaust pipe containing a needle-type throttle valve 524 designed to slow down the gage movement and thereby to protect the operator's hands. This movement will continue until the ball gages 342 contact opposite sides of the sole, stalling the piston in the cylinder. It will be understood that the various exhaust pipes shown in the diagram are connected with a sump 525 contained within the base casting 10, as shown in Fig. 17, and from which the pump 514 receives oil through a suction pipe 527. When, at a later time, the toe gage is to be moved out, then the return of the valve V—1 to the position shown in Fig. 18 will connect the pressure supply line 516 to the line 522, and the other end of the cylinder will exhaust through the line 518 and the exhaust port 530.

Figure 18:
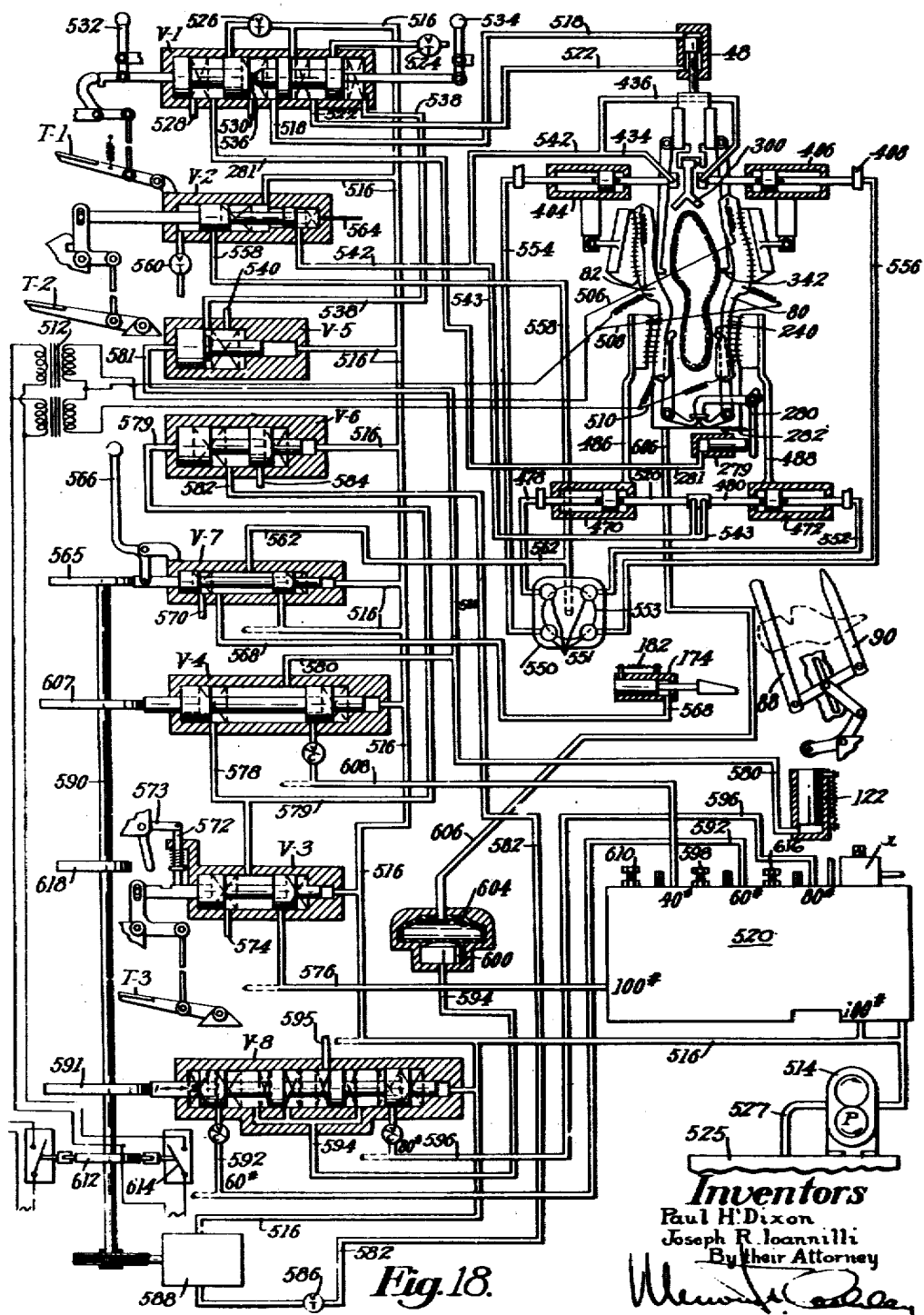
Fig. 18 is a diagram of the hydraulic mechanism, showing the connections between it and the various operating mechanisms.

This same valve V—1 controls the operation of the heel gages which are brought into engagement with the sole by the operation of the bell crank 280 when rotated counterclockwise, as viewed in Fig. 18, by pressure of the piston within the cylinder 279. Pressure is supplied to this cylinder through a line 281 which, when the piston of valve V—1 is moved to the right, will be supplied with pressure fluid through a throttle valve 526 connected to the supply line 516. At that time, the exhaust port 528 will be closed. When, at a later time, the valve piston V—1 is returned to the position shown, the heel gages will be moved outwardly by reason of the return, or clockwise movement of the bell crank 280 under the impulse of the spring 282 (Figs. 8 and 18) connected to it and the fact that this lever is connected by short springs, shown in Fig. 7, to the arms which turn the hubs on which these heel gages are mounted. This result is rendered possible by the escape of the pressure fluid in the cylinder through the line 281 and the exhaust port 528.

Since it may be desired to readjust the gages in case the gages fail properly to engage the edge face of the sole as the gages come into position, the valve V—1 has been provided with hand levers 532 and 534, it being noted that the piston rod is broken at 536 so that either the forepart gages or the heel gages may be operated separately. Movement of the pistons of valve V—1 to the right has already been described as effected by the treadle T—1. The return movement of these pistons is effected hydraulically through pressure supplied to a line 538 when a valve V—5 has been moved to the right, in a manner to be later described. This valve is provided with an exhaust port 540 which, with the valve V—5 in the left position shown, allows the right end chamber of the valve V—1 to exhaust at the time of the initial movement of its pistons to the right.

The next step in the operation of sole attaching is to move in the heater blades 80, 82 to their position over the margins of the sole, and it will be recalled that the toe ends of these blades are supported by the cylinders 404 and 406, while the heel ends are supported by the cylinders 470 and 472. In each case, the cylinders are slidable upon pistons carried by hollow rods through which pressure fluid is introduced to one end or the other of the cylinders as needed. When the sole has been positioned, the operator steps on a treadle T—2, thereby moving the piston of a valve V—2 to the right and connecting the pressure line 516 to a line 542. This branches and, at the toe end, is connected to the pipes 434 and 436 by means of which pressure fluid is supplied to the cylinders at the inner sides of the pistons, thereby moving the cylinders inwardly. The other branch 543 of the same line 542 is joined to pipes 488 and 520 leading to the cylinders 470 and 472 at the inner sides of the pistons. The other ends of the cylinders, during this operation, exhaust at the toe through the lines 554 and 556 and at the heel through the lines 478 and 552, all leading to a metering unit 550 which is connected through a line 558 to the valve V—2 and, when the latter is moved to the right, is connected to an exhaust containing a throttle valve 560 to slow the inward movement of the blades. This metering unit is a sort of servo-motor having four pistons 551 which are tied together loosely by a plate 553 positioned within the circle of the pistons and received in grooves therein to assure simultaneous operation of the blade cylinders. A branch 562 of the line 558 connects to the mid portion of a valve V—7, for a purpose to be later described. When the operator releases the treadle T—2, the valve V—2 is returned to the position shown in full lines by reason of the differential pressure areas on its two pistons the inner sides of which are under pressure from the supply line 516. In this illustrated position, the line 542 is connected directly to an exhaust 564. The valve V—7 is operated by a cam 565 during the normal cycle of the machine but, if for any reason the blades catch on the work, a hand lever 566 is provided for operating the valve V—7 which is normally held against the cam by pressure from the line 516 against the end of the piston rod. When valve V—7 is moved to the right, it also connects the pressure line 516 through a line 568 to the wedge-withdrawing cylinder.

Assuming, then, that the sole has been located on the pad, the heater blades have been moved into position above the sole margins, the shoe has been located above the blades and sole and the stirrups have been swung manually to position as in Fig. 15, a valve V—3 will be operated by a treadle T—3 and, after its piston has been moved to the right, it will be retained temporarily in that position by a spring-pressed latch 572 pivoted to a bell crank 573. In its right-hand position, an exhaust port 574 is closed and a pressure line 576 which also receives pressure fluid from the casing 520 at 100 pounds per square inch is connected through this valve V—3 and a line 578 to the valve V—4 and thence through a line 580 to the stirrup cylinder 122 and to a branch line 581 leading to the left end of the valve V—5. The stirrup piston is moved to pull down the stirrups and, since at this time, the valve V—7 is in the position shown, the cylinder 174 is free to exhaust through 568 and 570, and the wedge piston will be operated by the spring 182 which is attached to it to move the wedges in as soon as the stirrups are pulled down, thereby to hold them against the shoe. As soon as the pressure in the line 581, supplied through line 580, the valve V—4, line 578, the valve V—3 and line, 576, reaches a sufficient value, the force on the left end of the valve V—5 will overcome that received on the right end of the piston rod from the line 516 and, moving the piston to the right, will connect the line 581 to the line 538 so as thereby to provide pressure to move the valve V—1 to the left. When the pistons in V—1 have moved to the left, all the forepart gages will be retracted from the sole, and the spring 282 will move the heel gages out because the cylinder 279 and its line 281 can then exhaust through port 528.

The shoe is now ready to receive an initial pressure through inflation of the bag 62. As soon as the valve V—3 was operated by its treadle, the pressure fluid from the line 576 through V—3 and the line 579 was transmitted to the left end of the piston in a valve V—6, overbalancing the pressure from the line 516 against the end of the piston rod and causing movement of the piston to the right to open a line 582 to an exhaust pipe 584 and thereby to allow pressure fluid to flow from line 516 through a hydraulic motor 588 under the control of a throttle valve 586. This motor, acting through a worm and gear 589, will then start rotation of a cam shaft 590 carrying the cam 565 and other cams, to be later described. The cam shaft 590 is journaled in sub-frames 593 (Fig. 17) supporting a rod 597 on which are hung rocker arms 599 connected to the piston rods of valves V—4, V—7 and V—8 and to the bell crank 573 for the latch on valve V—3. As the cam shaft turns, a cam 591 thereon will release the piston of a valve V—8 for movement to the left and, in so doing, will connect a line 592 to a line 594 and will close an exhaust 595. This initial movement of the piston in the valve V—8 to the left is effected by pressure applied to the right end of the piston rod from line 516. The valve V—8 will also maintain a line 596 closed. It will be noted that the line 592 is connected to the valve V—8 through a check valve and, at its other end, is joined to the casing 520, in which there is a reducing valve controlled by adjustment of a nut 598. Thus, fluid pressure is delivered from the pump to the line 592 at a predetermined pressure of 60 pounds. This 60-pound pressure passing through the line 594, as just described, operates on a piston 600 contained within a bag-inflating device 602 in which there is a sack 604 containing water, the sack being connected through the line 606 to the inflatable bag 62 of the pad box. This arrangement enables the use of water as a hydraulic fluid in the bag of the pad box where oil would be deleterious to the rubber of the bag and, at the same time, permits the use of oil in the control valves and other operating cylinders.

As soon as the preliminary pressure was applied to the stirrups, a cam 612 on the cam shaft closes an electric switch 614 in the primary circuits of the transformer 512, thus supplying electric current from the secondaries to the circuits 506, 508 and 510 to heat the blades. This cam 612 is designed to open the switch just prior to the withdrawal of the blades which, in the meantime, have activated the cement on either the sole or the shoe, or both, as the case may be, so that the cement is in condition for the immediate attachment of the sole to the shoe when the blades are withdrawn.

The cam shaft 590 continues to turn and, in so doing, a cam 607 thereon operates the piston of the valve V—4 to cut off the pressure line 578 and to connect a line 608 to the lines 580 and 581. One effect of this is to change the pressure on the stirrups from 100 to 40 pounds, which is delivered to the line 608 from a reducing valve in the casing 520 the adjustment of which is maintained by a screw 610. After a proper interval, the valve V—8 is returned by cam 591 to its neutral position, indicated in full lines in the drawing, where the line 594 is exhausted and the pressure on the bag 62 is relieved. The switch is then opened by the cam 612. At about this time, or just preceding it, the valve V—7 was operated by the cam 565 to supply fluid to the wedge cylinder 174 by line 568 and to the blade cylinders by way of lines 516, 562 and the metering unit 550, as already described. The lessening of the pressure on the stirrups allows the blades to be withdrawn as their cylinders exhaust through lines 542 and 543 to valve V—2 and exhaust 564.

The valve V—4 is freed by cam 607 so that pressure on the end of its piston rod will move it to the left to is original position, whereupon full pressure is again applied to the stirrups, fluid from pressure line 576 passing through V—3 to line 578, through V—4 to line 580 to the stirrup cylinder 122. The increased pressure in the left end of the piston of valve V—5 will not affect its position since it has already been displaced to the right.

When the blades are withdrawn, the cam 565 permits the valve V—7 to be pressed to the left to connect the wedge cylinder 174 through its line 568 to the exhaust 570, thus allowing the wedges to be thrown into position by the spring 182 to hold the lowered stirrups.

The cam 591 then moves the piston of the valve V—8 to the right to connect the line 596 through a check valve to the line 594, thereby putting a final pressure of 80 pounds on the bag-operating piston 600. At this time, the exhaust line 595 will open only into a pocket between two pistons. The pressure in the line 596 is obtained through a reducing valve which is adjusted by the turning of a screw 616. It follows that there is a substantial pressure applied to the shoe and the sole since the stirrups are drawn down firmly under a pressure of 100 pounds and the wedge has been moved in to hold this pressure while the 80-pound pressure is applied to the pad 62. This is maintained for a brief interval which, however, is long enough to allow the cement to thoroughly set.

The cam shaft continues to turn for the duration of the cycle while the sole is being held against the shoe and, when it has been turned through 180°, its cycle is completed. Before that occurs, the cam 591 allows the piston of the valve V—8 to be returned to its neutral full line position, through pressure applied from the line 516 to the right end of the piston rod and, as it does so, it connects the line 594 of the bag piston to the exhaust 595, thereby relieving the pressure on the bag 62. The valve V—7 is also operated by cam 565 to supply pressure from line 516 through the line 568 to the wedge knockout cylinder 174, thus relieving the pressure on the stirrups. The va've V—3 is also allowed to return to starting position, as shown in the drawing, since the latch 572 is released by a cam 616, and hence the stirrup cylinder will be connected to the exhaust 574 through the lines 580, the valve V—4 and line 578. At the same time, pressure will be relieved in line 581, allowing valve V—5 to return to its full line position, thereby connecting the line 538 to the exhaust 540 and leaving the valve V—1 free for operation. This movement of valve V—3 also connects line 579 to exhaust 574 and allows the valve V—6 to return to its starting position, as shown in the drawings, thereby shutting off the exhaust 584 and stopping the motor 588 which is rotating the cam shaft. Valve V—7 is then released by its cam for movement to the left, connecting line 568 to exhaust 570 so that the wedges are released to their springs. The stirrups may then be swung back and the shoe removed from the machine.

While the automatic part of the cycle is proceeding, following the depression of the treadle T—3, the operator will be busy loading the other half of the machine, which is indicated in dot-and-dash lines at the left of Fig. 3, in which all the valves and all the treadles are duplicated but in which the same pressure-reducing valves within the casing 520 are employed. It will be noted that the pressure lines 516 and 576, as well as those carrying reduced pressure, to wit, the lines 592, 596 and 608, are all shown as provided with dotted extensions to the left through which pressure fluid may be supplied to these other valves. This is possible because of the fact that the gages operated by the valve V—1 and the blade cylinders operated by the valve V—2 take a relatively small quantity of oil so that their operation during the automatic portion of the cycle of the other half of the machine will not affect that automatic operation.

In brief, the operation includes the following steps in the sequence noted:

(1) The placing of a sole on the pad by the operator;
(2) Depression of treadle T—1 to cause the operation of the gages to locate that sole;
(3) Depression of treadle T—2 to cause the blades to be moved into position above the sole;
(4) The positioning of a shoe on the sole by the operator, and his adjustment of the stirrups to their correct position above the shoe;
(5) Depression of treadle T—3 to cause the application of 100 pounds pressure to the stirrups, allowing the wedges to slip into position.

This will be followed automatically by the following steps:
(6) The withdrawal of the gages;
(7) The starting of the cam shaft;
(8) The inflation of the bag to a preliminary pressure;
(9) The closing of the switch to supply heat to the blades for a brief period of, say, a second and a half;
(10) The relief of the stirrup pressure;
(11) The deflation of the bag so that only 40 pounds pressure is applied to the sole of the shoe;
(12) The opening of the switch;
(13) The withdrawal of the wedges, relieving pressure on the stirrups;
(14) The withdrawal of the blades;
(15) The application of full pressure to the stirrups;
(16) The return of the wedges to operative position;
(17) The final pressure (80 pounds) on the bag, holding the sole against the shoe till the cement sets;
(18) Deflation of the bag after a suitable time dwell of perhaps 4 or 5 seconds as the cam shaft rotates, the latter ultimately causing:
(19) The knocking out of the wedges;
(20) The release of the latch 572;
(21) The release of the stirrup pressure;
(22) The moving aside of the stirrups and removal of the shoe;
(23) The partial return of the wedges; and
(24) The stopping of the cam shaft motor.

Having thus described our invention, what we claim as new and desire to secure by Letters Patent of the United States is:

1. That method of attaching articles by means of a thermoplastic cement applied to the margin of at least one of the attaching surfaces, which consists in interposing a member between the marginal attaching surfaces in surface contact with the cement, applying pressure to the articles and the interposed member to bring the mid-portions of the articles into contact with each other, creating heat in the member after it has been brought into position between the articles, withdrawing the heated member laterally of the sole, and pressing the articles firmly together.

2. That method of attaching soles to shoes by means of a thermoplastic cement applied to at least one of the attaching surfaces, which consists in interposing a heater between the sole and the shoe in contact with the cement, applying pressure to hold the sole against the interposed heater and the shoe, withdrawing the heater without disturbing the position of the sole with respect to the shoe, and pressing the sole and shoe firmly together.

3. That method of attaching soles to shoes by means of a thermoplastic cement applied to at least one of the attaching surfaces, which consists in interposing a flexible metallic blade between the sole and the shoe in surface contact therewith, heating said blade while in that position to activate the cement, withdrawing the blade, and squeezing the sole and shoe together.

4. That method of attaching soles to shoes by means of a thermoplastic cement applied to at least one of the attaching surfaces, which consists in interposing a flexible metallic blade between the sole and the shoe, holding the three parts together, passing an electric current through said blade to heat it and hence to activate the cement, withdrawing the blade, and pressing the sole and shoe together.

5. That method of attaching soles to shoes by means of a thermoplastic cement applied to the margin of at least one of the contacting surfaces, which consists in laying a heat-conductive flexible blade upon the coated margin of a sole, placing a shoe thereon with its overlasted upper against the blade, applying pressure sufficient to cause the blade to assume the contour of the shoe bottom, supplying heat for a brief interval through said blade to the cement sufficient to activate the surface of the cement, drawing out the blade, and continuing the pressure for a period long enough to allow the cement to set.

6. That method of attaching soles to shoes having thermoplastic cement applied to at least one of the attaching surfaces, which cement has been allowed to dry before the sole and shoe are brought together, interposing a flexible metallic blade between the sole and shoe along the cemented margin, pressing the shoe parts into contact with the blade, transmitting electrical current through the length of said blade to activate only the surface of the cement, shutting off the current, withdrawing the blade, and then applying an increased pressure for a period long enough to allow the cement to set.

7. That method of attaching soles to shoes, which consists in placing a sole upon one of two coacting elements of a pressure mechanism, positioning flexible heating blades along the opposite margins of the sole, positioning a shoe upon the blades and the sole in alinement with the sole, bringing the other pressure element against the shoe, applying a preliminary pressure to the shoe parts and the blade to shape the sole to the shoe, heating the blades to activate the cement, reducing the pressure without permitting slippage between the sole and the shoe, withdrawing the blades laterally, and applying an increased pressure maintained for a period sufficient to allow the cement to set.

8. In a sole attaching machine, a pad box having a pad for supporting a sole, ball-line gage arms pivoted to the pad box, ball gages on said arms for engaging the edge face of the sole adjacent to the ends of the ball line, means for imparting equal and opposite movements to said arms, a forked toe gage movable laterally and longitudinally of the pad box, and templet means for controlling the lateral movement of said toe gage.

9. In a sole attaching machine, a pad box having a pad for supporting a sole, arms pivoted to the pad box, ball-line gages on said arms, means including a templet for imparting equal and opposite movement to said arms, a forked toe gage movable laterally and longitudinally of the pad box, and templet means for controlling the lateral movements of said toe gage.

10. In a sole attaching machine, a pad box having a pad for supporting a sole, arms pivoted to the pad box, ball-line gages on said arms, means including a templet for imparting equal and opposite movement to said arms, a forked toe gage movable laterally and longitudinally of the pad box, templet means for controlling the lateral movements of said toe gage, and fluid-pressure-operated means for moving the toe gage longitudinally of the pad.

11. In a sole attaching machine, a pad box having a pad for supporting a sole, ball-line gage arms pivoted to the pad box, ball gages on said arms for engaging the edge face of the sole adjacent to the ends of the ball line, means for imparting equal and opposite movements to said arms, a forked toe gage movable laterally of the pad box, a slide movable longitudinally of the pad box on which said toe gage is mounted, and templet means for controlling the lateral movement of said toe gage and the movement of the ball gages.

12. In a sole attaching machine, a pad box having a pad for supporting a sole, arms pivoted to the pad box, ball-line gages on said arms, means connecting said arms to cause equal and opposite movement thereof, a forked toe gage movable laterally and longitudinally of the pad box, and templet means for controlling the movements of said ball gage arms.

13. In a sole attaching machine, a pad box having a pad for supporting a sole, arms pivoted to the pad box, ball-line gages on said arms, means for imparting equal and opposite movement to said arms, a forked toe gage movable laterally of the pad, a slide movable longitudinally of the pad on which said toe gage is mounted, fluid-pressure-operated means for moving said slide, and a templet acting upon movement of the slide to impart lateral movement to the ball-line gages and to the toe gage.

14. In a sole attaching machine, a sole-support, pivoted levers carrying gages for the sides of a sole, means for connecting said levers for equal and opposite movement, and means for adjusting the position of said gages, comprising a wedge-shaped templet and a member coacting with the side of said templet and movable laterally to move said gage levers, said templet and said member being relatively movable in a direction lengthwise of the shoe, whereby the position of the gages is determined by the shape of the templet and the amount of relative longitudinal movement between said templet and said member.

15. In a sole attaching machine, a sole support, pivoted levers carrying gages for the sides of a sole, means for connecting said levers for equal and opposite movement, means for varying the position of said side gages, comprising a wedge-shaped templet and a member connected to the gages and coacting with the side of said templet and movable laterally to move said gage levers, said templet and said member being relatively movable in a direction lengthwise of the shoe, whereby the position of the gages is determined by the shape of the templet and the amount of longitudinal movement between said templet and said member, and a longitudinally-adjustable wedge interposed between said member and the templet for varying the lateral displacement of the side gages in accordance with the width of the shoe.

16. In a sole attaching machine, a support for a sole, a flat templet mounted in fixed position near that support, a slide, pivoted arms on said slide the ends of which coact with the sides of the templet, a forked toe gage carried by one of the said arms, ball-line gages for the sole, levers supporting said gages, means interconnecting said levers for equal and opposite movement, a member interposed between one of said levers and the arm coacting with the other side of the templet, and impositive means for moving said slide until the ball-line gages contact with the sides of the sole, the toe gage being also positioned longitudinally and laterally by said movement in accordance with the size and style of the shoe.

17. In a sole attaching machine, a support for a sole, a flat templet mounted in fixed position near that support, a slide, pivoted arms on said slide the ends of which coact with the sides of the templet, a forked toe gage carried by one of the said arms, ball-line gages for the sole, levers supporting said gages, means interconnecting said levers for equal and opposite movement, a member interposed between one of said levers and the arm coacting with the other side of the templet, and impositive means for moving said slide until the ball-line gages contact with the sides of the sole, the toe gage being also positioned longitudinally and laterally by said movement in accordance with the size and style of the shoe, said member being adjustable in accordance with the width of the sole to be treated.

18. In a sole attaching machine, a sole support, ball-line gages supported for lateral movement adjacent to said support, a forked toe gage supported for lateral and longitudinal movement adjacent to said support, means for moving said gages comprising a flat templet removably secured to the sole support, and templet-engaging members movable bodily and laterally in accordance with the length and width of the sole.

19. In a sole attaching machine, a pad box having a heel portion and a toe portion adjustable heightwise relatively to one another in accordance with the longitudinal contour of a shoe, gages for positioning the heel end of a sole on said pad box, and means for movably supporting said gages comprising studs which are fixedly mounted upon the heel portion of the pad box.

20. In a sole attaching machine, a pad box having a toe portion and a heel portion adjustable heightwise relatively to each other in accordance with the longitudinal contour of a shoe bottom, a gage for positioning the heel end portion of a sole on the pad box, a gage for positioning the rear portion of the shoe with respect to the sole, a gage arm carrying each of the gages, a stud at the rear of the pad box substantially perpendicular to its sole-receiving surface, both of the gage arms being pivotally mounted on said stud, and means for adjusting said shoe gage arm bodily laterally of the pad box with respect to the sole gage arm.

21. In a sole attaching machine, a pad box having a toe portion and a heel portion adjustable heightwise relatively to each other in accordance with the longitudinal contour of a shoe bottom, a pair of gages for positioning the heel end portion of a sole on the pad box, a pair of gages for positioning the rear portion of a shoe with respect to the sole, a gage arm carrying each of the gages, a pair of studs mounted on the rear portion of the pad box, one of each pair of gage arms being pivotally mounted on each stud, the shoe gage arms being mounted for movement on axes perpendicular to the studs, and springs sustaining the shoe gage arms and permitting movement of the shoe gages by the shoe toward the sole gages.

22. In a sole attaching machine, a pad box having a toe portion and a heel portion adjustable heightwise relatively to each other in accordance with the longitudinal contour of a shoe, a pair of gages for positioning the heel end portion of a sole on the pad box, a pair of gages for positioning the rear portion of a shoe with respect to the sole, a gage arm carrying each of the gages, and a pair of studs fixedly mounted on the rear portion of the pad box, one of each pair of gage arms being pivotally mounted on each stud.

23. In a sole attaching machine, a pad box having a toe portion and a heel portion adjustable heightwise relatively to each other in accordance with the longitudinal contour of a shoe, gages for positioning the heel end portion of a sole on the pad box, gages for positioning the rear portion of a shoe with respect to the sole, a gage arm carrying each of the gages, a pair of studs fixedly mounted on the rear portion of the pad box, a sole gage arm and a shoe gage arm being pivotally mounted on each stud, and means for adjusting each shoe gage arm with respect to the corresponding sole gage arm.

24. In a sole attaching machine, a pad box having a toe portion and a heel portion adjustable heightwise relatively to each other in accordance with the longitudinal contour of a shoe, gages for positioning the heel end portion of a sole on the pad box, gages for positioning the rear portion of a shoe with respect to the sole, a gage arm carrying each of the gages, a pair of studs fixedly mounted on the rear portion of the pad box, a sole gage arm and a shoe gage arm being pivotally mounted on each stud, and means for adjusting each shoe gage arm laterally of the pad box with respect to the corresponding sole gage arm.

25. In a sole attaching machine, a pad box having a toe portion and a heel portion adjustable heightwise relatively to each other in accordance with the longitudinal contour of a shoe bottom, gages for positioning the heel end portion of a sole on the pad box, gages having inclined surfaces for engaging the shoe in the vicinity of the breast line for positioning the rear portion of a shoe with respect to the sole, a pair of studs mounted on the rear portion of the pad box perpendicular to its sole-receiving surface, a pair of arms on each stud carrying respectively the sole gage and the shoe gage for one side of the work, the gage arms being movable about axes perpendicular to the studs, and means for yieldingly sustaining said last-mentioned arms.

26. In a sole attaching machine, a pad box having a toe portion and a heel portion adjustable heightwise relatively to each other in accordance with the longitudinal contour of a shoe, gages for positioning the heel end portion of a sole on the pad box, gages for positioning the rear portion of a shoe with respectt o the sole, a pair of studs mounted on the rear portion of the pad box perpendicular to its sole-receiving surface, a pair of arms on one stud carrying respectively the sole gage and the shoe gage for one side of the work, and a pair of arms on the other stud carrying the shoe gage and the sole gage for the other side of the work, said shoe gages having shoe engaging surfaces downwardly and inwardly inclined to direct the shoe into proper relation to the sole.

27. In a sole attaching machine, a pad box having a toe portion and a heel portion adjustable heightwise relatively to each other in accordance with the longitudinal contour of a shoe, gages for positioning the heel end portion of a sole on the pad box, gages for positioning the rear portion of a shoe with respect to the sole, a pair of studs mounted on the rear portion of the pad box perpendicular to its sole-receiving surface, and a pair of arms on each stud carrying respectively the sole gage and the shoe gage for one side of the work, the shoe gage arms being movable about axes perpendicular to the studs.

28. In a sole attaching machine, a shoe support, a gage for positioning the toe end of a shoe on said shoe support, a support for said gage movable to carry the gage from a remote position to a position in engagement with the shoe, said gage being pivotally mounted on said gage support, and means for tilting said gage on its support away from the shoe support in the remote position of the gage support.

29. In a sole attaching machine, a sole support having a longitudinal contour corresponding to the shape of the bottom of a shoe to which the sole is to be attached, a flexible activator blade adapted to be interposed between the sole and the shoe, means for loosely supporting the ends of said blade arranged to permit it to assume, under pressure, the contour of the sole support, means for applying pressure to the sole and shoe, and means for supplying heat to said blade after it has been positioned between the sole and the shoe.

30. In a sole attaching machine, a sole-supporting pad, an abutment for engaging a shoe and last, power-operated means for effecting relative movement of said pad and abutment to apply pressure to the sole and shoe, cement-activator members arranged to extend initially inward of the edge of the shoe bottom between the sole and shoe, and means for moving said members outwardly beyond the edge of the shoe bottom at a predetermined time in the pressure applying operation.

31. In a sole attaching machine, a sole-supporting pad, an abutment for engaging a shoe and last, power-operated means for effecting relative movement of said pad and abutment to apply pressure to the sole and shoe, cement-activator members arranged to extend initially inward of the edge of the shoe bottom between the sole and shoe, said members being flexibly conformable to the heightwise curvature of the shoe bottom in response to the pressure applied to the sole and shoe, and means for withdrawing said members from between the sole and shoe at a predetermined time in the course of the pressure applying operation.

32. In a sole attaching machine, an activator blade extending longitudinally of the sole, insulating plates adjacent to the ends of said blade, loops connecting the blade to the plates edge to edge, and electrical connections to the ends of said blades, whereby heat may be induced therein by passing an electric current through the blade to activate the cement.

33. In a sole attaching machine, a cement activating blade shaped to cover the cemented margin of a sole, the forepart portion of said blade being wider than the heel portion, and means for setting up currents of equal intensity along the various portions of said blade including electrical connections at the ends of the forepart portion and a connection at the end of the heel portion.

34. In a sole attaching machine, a cement activating blade shaped to cover the cemented margin of a sole, the forepart portion of said blade being wider than the rear portion, means for setting up currents of equal intensity in the various portions of the length of said blade comprising electrical connections at the ends of the forepart portion and a connection at the end of the heel portion, and electrical means for supplying different voltages across the forepart connections and the rear-part connections.

35. In a sole attaching machine, an activator blade extending longitudinally of a sole and adapted to be overlaid upon the cemented margin of the sole, supports for the end portions of said blade, an individual hydraulic device for moving each of these end supports, and means for assuring substantially simultaneous movement of said supports, thereby to withdraw said blade without twisting it.

36. In a sole attaching machine, a sole support, an activator blade extending lengthwise of said support and adapted to be overlaid upon one margin of the sole between it and a shoe, a hollow rod extending transversely of the sole support, a piston-like enlargement on said rod, a cylinder slidable on said rod and said piston, means to supply fluid pressure to one side or the other of said piston to move the cylinder, and a connection between said cylinder and an end portion of said blade arranged to permit rocking movement of the blade with respect to the direction of movement of the cylinder as the blade is withdrawn.

37. In a sole attaching machine, a sole support, an activator adapted to overlie a portion of a sole on said support, a hydraulically operable member mounted for movement transversely of the sole, a hanger on said member, and a rockshaft attached to said activator pivoted in said hanger.

38. In a sole attaching machine, a flexible activator blade, means for supporting an end portion of said blade, means for moving said supporting means laterally to withdraw the blade from its position between the sole and the shoe, and a connection between the withdrawing means and the blade comprising a rockshaft.

39. In a sole attaching machine, an activator blade adapted to be positioned between a sole and a shoe, rockshafts supporting the end portions of said blade, a gimbal-like joint between one end portion and its rockshaft, and means guided for movement in predetermined directions acting upon said rockshafts to withdraw the blade.

40. In a sole attaching machine, a sole support, an activator adapted to overlie the margin of a sole on said support, laterally slidable members having rockshafts attached to the end portions of said activator, rockers upon said rockshafts, and means for engagement with said rockers to tilt said activator as the slidable members are moved transversely of the sole support.

41. In a sole attaching machine, an activator, a pivoted support for an end portion of said activator, means for moving said support inwardly of a sole to bring the activator over the marginal edge of the sole, and means for tilting up the inner edge of the activator so that it will not engage the edge of the sole during its inward movement and then depressing the activator to bring it into contact with the sole as it is moved into position over the sole.

42. In a sole attaching machine, a sole support, a laterally movable power-operated slide, an activator for cement on the margin of the sole, a pivotal connection between the activator and the laterally movable slide, and cam-operated means for tilting the inner edge of said activator upwardly to avoid the edge of the sole and then positively moving it down into coacting relation with the sole as it reaches its inward position.

43. In a sole attaching machine, a pad box having fore and heel part sections hingedly interconnected, power-operated slides positioned one in fixed relation to the forepart of the pad box and the other in fixed relation to the heel portion of the pad box, rockshafts on said slides, a flexible blade bent to follow the longitudinal contour of the pad box and attached to said rockshafts, rockers on said shafts, and means for engagement with said rockers to tilt the blade upwardly when in its outer position and to depress the blade as it approaches its inner position over the sole.

44. In a sole attaching machine, a pad box having adjustably interconnected fore and heel part sections adapted to be displaced angularly with respect to one another, hangers movably supported on said sections and provided with bearings substantially parallel to the surfaces of the sections, rockshafts carried in said bearings, a blade supported at its end by said rockshafts, said blade being flexible to bend as the pad-box sections are adjusted, and means for imparting lateral movement to said hangers to change the position of the blade with respect to a piece of work on the pad box.

45. In a sole attaching machine, an activator adapted to be positioned between a sole and a shoe, a transversely operable slide, a rockshaft on said slide for supporting an end portion of said activator, a rocker for tilting said rockshaft to raise or lower the activator, and a brake for restraining free movement of the rockshaft.

46. In a sole attaching machine, means for applying pressure to hold a shoe and a sole together comprising an abutment movable toward and away from the shoe and an inflatable bag, fluid-pressure-operated motors for moving said abutment and for inflating said bag, said motors being included in circuits supplied with fluid from a pressure source, control valves for said motors, operator-controlled means for moving at least one of said valves, and power-operated means for operating others of the valves in a definite cycle to cause a movement of the abutment to hold the shoe against the sole, the inflation of the bag, the reduction of bag pressure after an interval, and the release of the abutment.

47. In a sole attaching machine, a work-supporting pad having an inflatable bag, an abutment for clamping a shoe against a sole on said pad and movable heightwise with respect to the shoe, a wedge for retaining said abutment in clamping position, a movable fluid-pressure-operated means connected to said abutment and to said wedge, fluid-pressure-operated means for inflating said bag, control valves for said several fluid-pressure-operated means, operator-controlled means for moving a valve in one direction to move the abutment to clamp the shoe, and power-operated means for moving other valves to cause the inflation of the bag and subsequently to deflate the bag and to knock said wedge out of retaining position, thereby to release the abutment.

48. In a sole attaching machine, a work-supporting pad having an inflatable bag, a stirrup-like abutment adapted to hold a shoe against a sole on said pad, a spring-operated wedge for retaining said stirrup-like abutment in holding position, fluid-pressure means for pulling down said stirrup, for removing said wedge, and for inflating the bag, control valves for said fluid-pressure means, a treadle for moving a valve to cause the stirrup to be pulled down onto the shoe to clamp it, a driven member, other valves controlled by said member, and operator-controlled means for starting said driven member to cause the operation of said valves in a predetermined cycle thereby to effect the inflation of the bag, the withdrawal of the wedge, and the relief of pressure on the bag and on the stirrup.

49. In a sole attaching machine, the combination with a pad adapted to receive a sole and shoe and inflatable to apply pressure to the sole and shoe, an abutment for supporting the shoe against the pressure of the pad, said abutment being movable toward the pad to increase the pressure of the pad on the bottom of the shoe and reversely to release the shoe from pressure, and a spring-operated wedge for retaining the abutment in pressure-applying position, of fluid-pressure means for operating said abutment and for inflating said pad and for also operating said wedge against the resistance of its operating spring to release the abutment, and means for controlling said fluid-pressure means including a plurality of valves one of which is manually operable to start said fluid-pressure means in operation to move the abutment toward the pad, and a driven member for operating others of said valves in predetermined time relation to cause said fluid-pressure means to inflate said pad and then to operate said wedge to release the abutment, and finally to deflate the pad and to move said abutment reversely to release the shoe and sole from pressure.

50. In a sole attaching machine, a sole-supporting pad, an abutment for engaging a shoe and last, said pad and abutment being relatively movable to apply pressure to a sole and shoe and to release the sole and shoe from pressure, a spring-operated wedge for retaining the abutment in pressure applying position, fluid-pressure means for effecting such relative movement of the pad and abutment and for also moving said wedge to release said abutment, valve mechanisms for controlling said fluid-pressure means, a member movable by the operator for actuating one of said valve mechanisms to start the relative movement of the pad and abutment, and power-operated means for operating others of said valve mechanisms in a definite cycle to impart a further relative movement to the pad and abutment to increase the pressure on the sole and shoe, and finally to move the wedge reversely to release the abutment and to impart relative movement to the pad and abutment in directions to release the sole and shoe from pressure.

51. In a sole attaching machine, a sole-supporting pad having an inflatable bag, gages for locating a sole on the pad, an abutment for holding a shoe against said sole, fluid-pressure means for moving said gages into and out of operative position and for inflating said bag, valve mechanisms for controlling said fluid-pressure means, a treadle for operating one of said valve mechanisms to move the gages into operative position, power-operated means for operating another of said valve mechanisms to inflate the bag, and a treadle for starting said power-operated means in operation.

52. In a sole attaching machine, means for applying pressure to hold a shoe and a sole together, cement-activator blades supported for in-and-out movement laterally of the shoe, fluid-pressure-operated motors for moving said blades and for operating said pressure-applying means, said motors being included in circuits supplied with fluid from a pressure source, control valves for said motors, operator-controlled means for moving at least one of said valves, and power-operated means for operating others of the valves in a definite cycle to cause the application of a preliminary pressure to the work, the relief of that pressure, and the subsequent withdrawal of the blades.

53. In a sole attaching machine, a work-supporting inflatable pressure-pad, an abutment for holding a shoe against a sole on said pad, means to inflate the pad, cement-activator blades adapted to be interposed between the sole and the shoe, fluid-pressure-operated motors for withdrawing said blades, circuits in which said motors are connected supplied with fluid from a pressure source, valves controlling said inflating means and said motors, a power-operated device for operating some of the valves, and an operator-controlled means for starting said power-operated device in operation to cause the withdrawal of the blades and the application of increased pressure.

54. In a sole attaching machine, a work-supporting inflatable pad, an abutment for holding a shoe against a sole on said pad, cement-activa-tor blades adapted to be interposed between the sole and the shoe, fluid-pressure means connected to said blades and arranged to move them into and out of operative position, fluid-pressure means for inflating said pad, valves controlling both said fluid-pressure means, operator-controlled means for operating a valve to move the blades to positions overlapping the margins of the sole, and power-operated means for operating a plurality of said valves to cause the application of preliminary pressure to the shoe, the relief of that pressure and the withdrawal of the blades.

55. In a sole attaching machine, a work-supporting inflatable pad, an abutment holding a shoe against a sole on said pad, cement-activator blades adapted to be interposed between the sole and the shoe, means for heating said blades from an outside source, fluid-pressure means connected to said blades and arranged to move them into and out of operative position, fluid-pressure means for inflating said pad, valves controlling both said fluid-pressure means, operator-controlled means for operating a valve to effect movement of the blades to positions overlapping the margins of the sole, and power-operated means controlling said heating means and for operating a plurality of valves to cause the application of preliminary pressure to the shoe, the heating of the blades, the relief of that pressure, and the withdrawal of the blades.

56. In a sole attaching machine, a work-supporting inflatable pad, an abutment holding a shoe against a sole on said pad, cement-activator blades adapted to be interposed between the sole and the shoe, means for heating said blades from an outside source, fluid-pressure means connected to said blades and arranged to move them into and out of operative position, fluid-pressure means for inflating said pad, valves controlling said fluid-pressure means, operator-controlled means for operating a valve to effect movement of the blades to positions overlapping the margins of the sole, and power-operated means controlling said heating means and for operating a plurality of valves to cause the application of preliminary pressure to the shoe, the heating of the blades, the relief of that pressure, the withdrawal of the blades and the application of increased pressure while the cement sets.

57. In a sole attaching machine, activator blades mounted for movement to a position between the surfaces to be cemented, a plurality of fluid-pressure-operated means to move said blades to that position and to withdraw the blades, a treadle-operated valve arranged to supply pressure to said blade-moving means, another valve arranged to control the operation of said blade-moving means to withdraw the blades, and means for equalizing the pressure supplied to said blade-moving means whereby their movement will be synchronized to avoid twisting the blades.

PAUL H. DIXON.
JOSEPH R. IOANNILLI.

REFERENCES CITED

The following references are of record in the file of this patent:

UNITED STATES PATENTS

| Number | Name | Date |
|---|---|---|
| 382,631 | Avery | May 8, 1888 |
| 2,342,725 | Crepeau | Feb. 29, 1944 |
| 2,066,423 | Schoenky | Jan. 5, 1937 |
| 2,323,325 | Hart, Jr., et al. | July 6, 1943 |

FOREIGN PATENTS

| Number | Country | Date |
|---|---|---|
| 148,262 | Germany | Aug. 4, 1921 |

Certificate of Correction

Patent No. 2,417,065.  March 11, 1947.

PAUL H. DIXON ET AL.

It is hereby certified that errors appear in the printed specification of the above numbered patent requiring correction as follows: Column 5, line 69, for "ribs" read *rib*; column 7, line 69, for "numbers" read *members*; column 10, line 12, for "fall-line" read *ball-line*; and that the said Letters Patent should be read with these corrections therein that the same may conform to the record of the case in the Patent Office.

Signed and sealed this 6th day of January, A. D. 1948.

[SEAL]

THOMAS F. MURPHY,
*Assistant Commissioner of Patents.*